(12) United States Patent
Morad et al.

(10) Patent No.: US 9,648,534 B2
(45) Date of Patent: May 9, 2017

(54) METHOD AND SYSTEM OF ANALYZING A PLURALITY OF CELLS IN A CELLULAR TELECOMMUNICATION NETWORK

(75) Inventors: Roy Morad, Hod Hasharon (IL); Idan Cohen, Gan Yavne (IL)

(73) Assignee: EVOLUTION SYSTEMS LTD. (IL)

( * ) Notice: Subject to any disclaimer, the term of this patent is extended or adjusted under 35 U.S.C. 154(b) by 394 days.

(21) Appl. No.: 13/985,269

(22) PCT Filed: Feb. 9, 2012

(86) PCT No.: PCT/IL2012/050040
§ 371 (c)(1),
(2), (4) Date: Aug. 13, 2013

(87) PCT Pub. No.: WO2012/107930
PCT Pub. Date: Aug. 16, 2012

(65) Prior Publication Data
US 2013/0324132 A1 Dec. 5, 2013

Related U.S. Application Data

(60) Provisional application No. 61/441,296, filed on Feb. 10, 2011, provisional application No. 61/453,305, filed on Mar. 16, 2011.

(51) Int. Cl.
*H04W 36/22* (2009.01)
*H04W 24/02* (2009.01)
(Continued)

(52) U.S. Cl.
CPC ........ *H04W 36/22* (2013.01); *H04W 24/02* (2013.01); *H04W 24/08* (2013.01); *H04W 36/0083* (2013.01)

(58) Field of Classification Search
CPC .. H04W 24/02; H04W 24/08; H04W 36/0083
(Continued)

(56) References Cited

U.S. PATENT DOCUMENTS

| 8,897,780 B2* | 11/2014 | Lindoff | H04W 52/0232 |
| | | | 455/436 |
| 2006/0128394 A1* | 6/2006 | Turina | H04W 16/06 |
| | | | 455/453 |

(Continued)

OTHER PUBLICATIONS

Mitsubishi Electric: "Cell Switch ON/OFF for Intra-RAT ES Scenario", 3GPP Draft; R3-110262 (Intra-RAT ES Scenario), $3^{rd}$ Generation Partnership Project (3GPP), Mobile Comptence Centre; 650, Route Des Lucioles; F-06921 Sophia-Antipolis Cedex; France, vol. RAN WG3, no. Dublin, Ireland; 201101117, Jan. 11, 2011.

(Continued)

*Primary Examiner* — Qun Shen
(74) *Attorney, Agent, or Firm* — Workman Nydegger

(57) ABSTRACT

The presently disclosed subject matter provides a method of analyzing a plurality of cells of a cellular telecommunication network, the plurality of cells providing telecommunication services to a service area and being set with one or more cell configuration parameters enabling a cell rating for mobile stations in the service area. The method comprises selecting one or more cells among the plurality of cells; changing at least one cell configuration parameter of at least one of the plurality of cells during an intervention period in order to affect a rate of the selected cells in the cell rating for the mobile stations in the service area; monitoring traffic events communicated using the selected cells during the intervention period; and determining radio coverage contribution information of the selected cells by correlating the monitored traffic events and the change of cell configuration parameter.

30 Claims, 11 Drawing Sheets

(51) Int. Cl.
*H04W 36/00* (2009.01)
*H04W 24/08* (2009.01)

(58) Field of Classification Search
USPC .......................................................... 455/438
See application file for complete search history.

(56) References Cited

U.S. PATENT DOCUMENTS

| | | |
|---|---|---|
| 2009/0252073 A1 | 10/2009 | Kim et al. |
| 2010/0290389 A1 | 11/2010 | Hou et al. |
| 2010/0323698 A1* | 12/2010 | Rune ..................... H04W 48/06 455/436 |
| 2011/0124330 A1* | 5/2011 | Kojima ................. H04W 36/32 455/424 |
| 2012/0108245 A1 | 5/2012 | Zhang et al. |
| 2012/0164955 A1 | 6/2012 | Amirijoo et al. |
| 2012/0295631 A1 | 11/2012 | Moe et al. |
| 2014/0004841 A1 | 1/2014 | Morad et al. |

OTHER PUBLICATIONS

3GPP: "3$^{rd}$ Generation Partnership Project; Technical Specification Group Radio Access Networks' Evolved Universal Terrestrial Radio Access (E-ULTRA); Potential solutions for energy saving for E-UTRAN (Release 10)", 3GPP Draft; ProposedChangeSTR36927, 3rd Generation Partnership Project (3GPP), Mobile Comptence Centre; 650, Route Des Lucioles; F-06921 Sophia-Antipolis Cedex; France, vol. RAN WG3, no. Dublin, Ireland; 201101117, Jan. 11, 2011.

"3$^{rd}$ Generation Partnership Project; Technical Specification Group Services and System aspects; Telecommunication management; Energy Saving Management (ESM); Concepts and (Release 10)", 3GPP Standard; 3GPP TS 32.551, 3$^{rd}$ Generation Partnership Project (3GPP), Mobile Comptence Centre; 650, Route Des Lucioles; F-06921 Sophia-Antipolis Cedex; France, No. V10.0.1, Feb. 8, 2011, pp. 1-22.

* cited by examiner

| Cell | Number of Traffic Events | Required-ERCC + Prime-ERCC | Required-ERCC | Required-ERCC + Prime-ERCC + Supplement-ERCC = ERCC to SA |
|---|---|---|---|---|
| Cell A | 2 | - | 2/10 = 20% | - |
| Cell B | 3 | - | - | - |
| Cell C | 5 | - | - | - |
| Total in SA | 10 | - | - | - |

| Cell | Number of Traffic Events | Required-ERCC + Prime-ERCC | Required-ERCC | Required-ERCC + Prime-ERCC + Supplement-ERCC = ERCC to SA |
|---|---|---|---|---|
| Cell A | 9 | - | - | 9/10 = 90% |
| Cell B | 0 | - | 0% | - |
| Cell C | 1 | - | - | - |
| Total in SA | 10 | - | - | - |

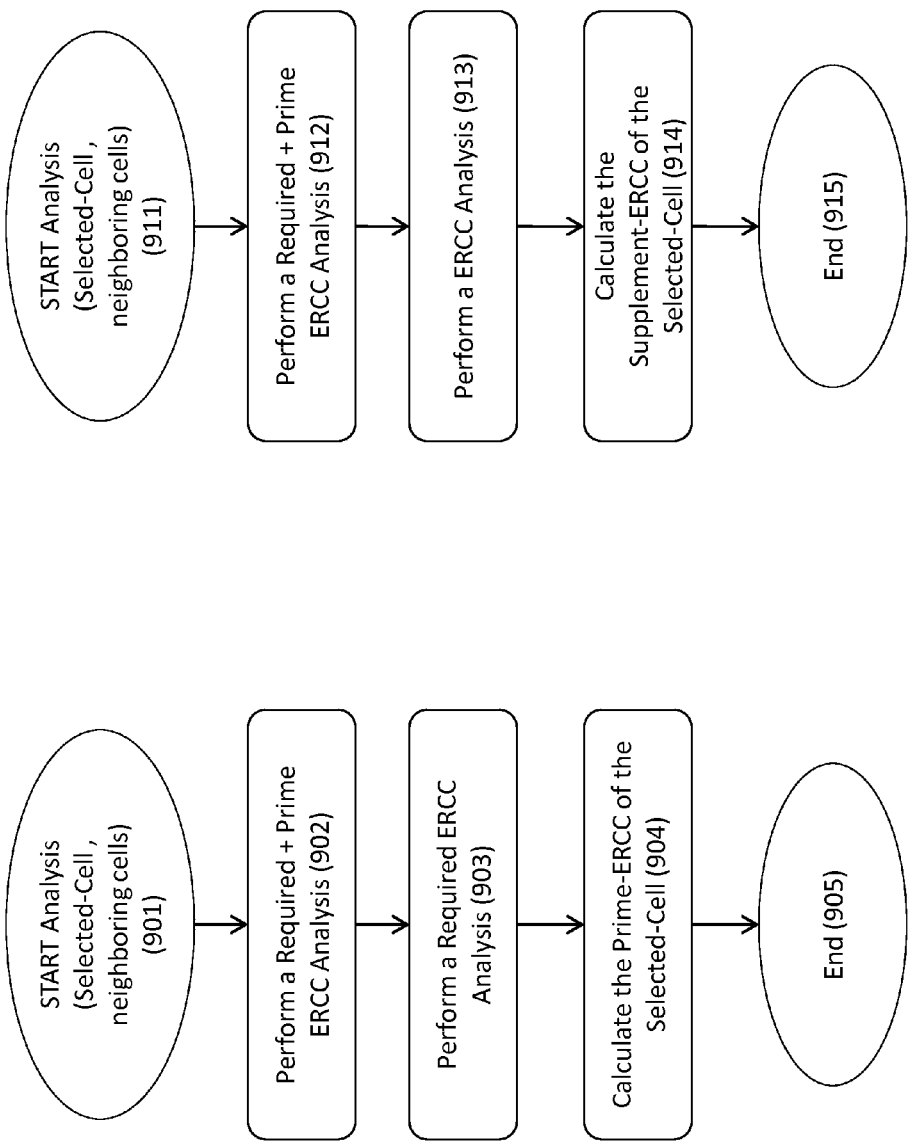

METHOD AND SYSTEM OF ANALYZING A PLURALITY OF CELLS IN A CELLULAR TELECOMMUNICATION NETWORK

CROSS REFERENCE TO RELATED APPLICATIONS

This application is a U.S. Nationalization of PCT Application Number PCT/IL2012/050040, filed on Feb. 9, 2012, which claims priority to U.S. Provisional Application No. 61/453,305, filed on Mar. 16, 2011 and U.S. Provisional Application No. 61/441,296, filed on Feb. 10, 2011, the entireties of which are incorporated herein by reference.

FIELD OF THE INVENTION

The present invention relates to methods and systems of analyzing a plurality of cells of a cellular telecommunication network. More particularly, the present invention relates to a system and method enabling to obtain information on the radio coverage contribution of one or more cells among a plurality of cells in a cellular telecommunication network, for improving a configuration of the network.

BACKGROUND OF THE INVENTION

Cellular telecommunication networks are based on the ability to provide continuous radio coverage over large geographical areas. This is achieved by the deployment of Radio Base Stations (RBS), each transmitting radio signals and providing radio coverage to a specific area. The radio coverage of a network is the front line and the connecting chain between the subscribers and the network services.

It is well known that radio coverage of a cellular telecommunication network is one of the most costly and limited resources in the network, and is also subject to much interference. Therefore, it is of great importance to utilize the radio resources of the network with high efficiency. Optimal utilization of the network's radio resources can greatly improve network radio coverage, traffic capacity and overall Quality of Services (QOS) and can save network operators significant operational and capital expenses.

Cellular network operators are required and expected by customers to provide the best possible quality of services. Constant maintenance and optimization of a cellular communication network constitutes a major portion of a network operators' budget and is a complicated task which requires trained engineers, advanced systems and tools. Additionally, a growing demand for more coverage, traffic capacity, new services and quality of service, requires network operators to have better and more precise solutions to meet current demands.

Nowadays, network operators have at their disposal, a number of methods to analyze radio coverage for the purpose of optimization and maintenance of the network, examples of such a method being:

i. Employing radio propagation models, which are simulated mathematical calculations of radio coverage provided by cells of the network. The method of radio propagation does not take into account the actual radio coverage conditions that exist in the Service Area of each cell and could be very inaccurate, costly, and quickly become out-dated due to changes in the network.

ii. Collection and analysis of radio measurements and Key Performance Indicators (KPI) provided by Mobile Stations (MS) to the Radio Base Station (RBS) or the Radio Network Controller (RNC) during a communication session. Such a method has many drawbacks, such as high cost of systems, complicated deployment, overloading the RNC, and possibly providing limited data.

iii. Drive Test, typically done by a RF/cellular engineer driving a vehicle around a designated area while making one or more traffic sessions (such as voice calls) using his cellular equipment. During the drive test, the RF engineer monitors traffic and radio performance by noting radio link drops, for example, and/or collecting actual downlink data such as signal strength directly from a mobile telephone. Such a method bears high cost and does not represent the radio condition experienced by all MSa in the area in which the Drive Test was conducted, mainly because the Drive Test is limited only to public areas.

Each of the above methods can provide only a partial solution to the need of operators to receive accurate and indicative analysis of radio coverage conditions provided by the network to their subscribers, and to do so in a cost effective manner. Therefore, there is a need for a system and method of analyzing radio coverage contribution of cells to a network, for the purpose of analyzing, planning, optimization and maintenance of the network.

SUMMARY OF THE INVENTION

Generally speaking, the present invention is directed toward a method and system for obtaining the Effective Radio Coverage Contribution (ERCC) of a cell as perceived by Mobile Stations (MS) located in the cells' Service Area (SA) of a cellular telecommunication network. Obtaining the ERCC of each cell to various SA in the network can be used for analyzing, planning, optimizing and improving the operation of cellular telecommunication networks. The present invention provides a statistical analysis that is based on the way MSs perceive the radio coverage provided by the network cells and that obtains the ERCC of a cell to a Service Area comprising one or more other cells.

In other words and as described hereinafter in more detail, the method may provide information on the contribution of a cell to the radio coverage of a service area based on analyzing the behavior of the mobile stations in the service area, in response to a perturbation of the cell parameters influencing the rating of the cells for the mobile stations in the service area. In certain embodiments, the information obtained may be referred to as ERCC of a cell in the service area which may be indicative of a probability that a mobile station in the service area be covered by the cell i.e. be able to communicate with said cell.

The analysis can also provide three main ERCC sub-groups of a cell, which are known as the:

i. Required-ERCC—measures how much the radio coverage provided by a cell to the SA is required to MSs in the SA, and how, without the radio coverage contributed by the cell to the SA, some MSs in the SA will not have service. In other words, and as described in more detail hereinafter, in certain embodiments, the information obtained may be referred to as Required-ERCC which may provide information on the level of essentiality of a cell for achieving full radio coverage of the service area based on analyzing the behavior of the mobile stations in the service area. The Required-ERCC of a cell may be indicative of a probability that a mobile station in the service area be dependent on the radio coverage of the cell i.e. not covered by another cell in the service area.

ii. Prime-ERCC—measures how much the radio coverage provided by a cell to a SA is overlapping with the radio coverage contributed by other cells in the SA, and also that the radio coverage provided by the cell is the best from all other cells in the SA.

In other words, and as described hereinafter in more detail, in certain embodiments, the information obtained may be referred to as Prime-ERCC which may provide information on the level of importance of a cell for achieving an acceptable quality of service in the service area, based on analyzing the behavior of the mobile stations in the service area. The Prime-ERCC of a cell may be indicative of a probability that a mobile station in the service area considers the cell as the best cell to communicate or to camp on.

iii. Supplement-ERCC—measures how much the radio coverage provided by a cell to a SA is overlapping with the radio coverage contributed by other cells in the SA, but the radio coverage contributed by the cell is not the best with respect to at least one other cell in the SA.

In other words, and as described hereinafter in more detail, in certain embodiments, the information obtained may be referred to as Supplement-ERCC which may provide information on the level of subsidiarity of a cell in the service area based on analyzing the behavior of the mobile stations in the service area. The Supplement-ERCC of a cell may be indicative of a probability that a mobile station in the service area does not consider the cell as the best cell to communicate or to camp on.

The Radio Coverage Analysis (RCA) System of the present invention includes a Cell Configuration Manager (CCM) module for changing values of one of more parameters of selected cells, A Network Performance Monitor (NPM) module for monitoring of the traffic and performance of selected cells, and an Intervention Analysis Engine (IAE) that is responsible for conducting the various ERCC analyses on selected cells and to correlate operation of the CCM and NPM modules.

The present invention may obtain the ERCC and sub-groups, for selected cells, by monitoring the traffic (Traffic Events) of the cell and other cells in a predefined SA. The RCA system also changes various cell parameters for a so-called Intervention Period of the analysis, which could vary between hours to days.

The new cell configuration affects the way Mobile Station (MS) located in the SA of the selected cell, interacts and communicates with the selected cell and other cells in the SA. More specifically, the new cell configuration aims to reshape the traffic distribution between the cells in the SA by causing MSs to camp on and communicate through various cells in the SA, as selected by the RCA system, when possible.

Additionally, it can be noted that reshaping the traffic may be obtained either by modifying the cell configuration parameter of the selected cell or by modifying the cell configuration parameters of the other cells in the service area. Modifying the cell configuration parameters in the SA influences the selection of the cell through which mobile stations in the area communicate.

Therefore, MSs in the SA could be logically divided into two groups respectively comprising the MS that:

i. Complied with the configuration changes done by the system and are camping and communicating through the cell(s) as forced by the RCA system.

ii. Did not comply with the configuration changes done by the system.

The effect on the interaction and communication of the MSs with the selected cell and other cells in the SA are monitored. More specifically, the NPM module will monitor various TEs that indicate originating and/or terminating services to/from the selected cell and other cells in the SA.

Based on this "cause and effect" process, the RCA system can obtain the ERCC, Required-ERCC, Prime-ERCC and Supplement-ERCC of a selected cell, as perceived by MSs present in the SA for the duration of the Analysis.

Therefore, in a first aspect, the presently disclosed subject matter provides a method of analyzing a plurality of cells of a cellular telecommunication network, the plurality of cells providing telecommunication services to a service area and being set with one or more cell configuration parameters enabling a cell rating for mobile stations in the service area. The method comprises selecting one or more cells among the plurality of cells; changing at least one cell configuration parameter of at least one of the plurality of cells during an intervention period in order to affect a rate of the selected cells in the cell rating for the mobile stations in the service area; monitoring traffic events communicated using the selected cells during the intervention period; and determining radio coverage contribution information of the selected cells by correlating the monitored traffic events and the change of cell configuration parameter.

In some embodiments, the method according to the first aspect, further comprises monitoring traffic events communicated using the plurality of cells during the intervention period so as to determine a total amount of traffic events communicated using the plurality of cells during the intervention period; and determining the radio coverage contribution information based on an amount of traffic events communicated using the selected cells and the total amount of traffic events communicated using the plurality of cells.

In some embodiments of the method according to the first aspect, the radio coverage contribution information is determined as a ratio between the amount of traffic events communicated using the selected cells and the total amount of traffic events communicated using the plurality of cells.

In some embodiments of the method according to the first aspect, changing at least one cell configuration parameters comprises making the selected cells the least rated cells for the mobile stations in the service area.

In some embodiments of the method according to the first aspect, the radio coverage contribution information comprises a required effective radio coverage contribution of the selected cells representing a ratio of the mobile stations in the service area that are dependent on the radio coverage of the selected cells.

In some embodiments of the method according to the first aspect, changing the at least one cell configuration parameters comprises making the selected cells the most rated cells for mobile stations in the service area.

In some embodiments of the method according to the first aspect, the radio coverage contribution information comprises an effective radio coverage contribution of the selected cells representing the ratio of the mobile stations in the service area that have radio reception from the selected cells.

In some embodiments of the method according to the first aspect, the traffic events monitored comprise bi-directional communications between one of the mobile stations in the service area and one of the plurality of cells providing telecommunication services to the service area, the communication being either initiated by the mobile stations or by the plurality of cells.

In some embodiments of the method according to the first aspect, the bi-directional communications comprise at least one of: radio initiated channels, calls initiated and received, channel handed over to a cell of the service area, channel handed over from a cell of the service area, periodic location update, normal location update and location update indicating return from a no coverage area.

In some embodiments, the method according to the first aspect further comprises associating traffic events to mobile station identities and the radio coverage contribution information is obtained by correlating the monitored traffic events associated with different mobile station identities and the change of parameters.

In some embodiments of the method according to the first aspect, the radio coverage contribution information is determined as a ratio between the amount of traffic events communicated using the selected cells associated with different mobile stations' identities and the total amount of traffic events communicated using the plurality of cells of the service area associated to different mobile stations' identities.

In some embodiments of the method according to the first aspect, changing at least one cell configuration parameter is performed on a cell configuration parameter that affects the cell rating for idle mobile stations.

In some embodiments of the method according to the first aspect, changing at least one cell configuration parameters is performed on parameters that affect the cell rating for active mobile stations.

In some embodiments of the method according to the first aspect, the cell rating for idle mobile stations in the service area is performed by the idle mobile stations based on control channels broadcasted by the plurality of cells and received by the idle mobile stations; changing at least one cell configurations parameters comprises changing one or more parameters of the control channel broadcasted by the at least one of the plurality of cells so as to affect the rate of the selected cells in the cell rating performed by the idle mobile stations in the service area.

In a second aspect, the presently disclosed subject matter provides a method of analyzing a plurality of cells of a cellular telecommunication network, the plurality of cells providing telecommunication services to a service area and being set with one or more cell configuration parameters enabling a cell rating for mobile stations in the service area. The method comprises selecting one or more cells among the plurality of cells; changing at least one cell configuration parameter of at least one of the plurality of cells during a first intervention period in order to make the selected cells the least rated cells for the mobile stations in the service area; monitoring traffic events communicated using the selected cells during the first intervention period: monitoring traffic events communicated using the plurality of cells during the first intervention period so as to determine a total amount of traffic events communicated using the plurality of cells during the first intervention period: determining a required effective radio coverage contribution of the selected cells as a ratio between the amount of traffic events communicated using the selected cells and the total amount of traffic events communicated using the plurality of cells during the first intervention period. The method further comprises changing at least one cell configuration parameter of at least one of the plurality of cells during a second intervention period in order to make the selected cells the most rated cells for the mobile stations in the service area; monitoring traffic events communicated using the selected cells during the second intervention period: monitoring traffic events communicated using the plurality of cells during the second intervention period so as to determine a total amount of traffic events communicated using the plurality of cells during the second intervention period; determining an effective radio coverage contribution of the selected cells as a ratio between the amount of traffic events communicated using the selected cells and the total amount of traffic events communicated using the plurality of cells during the second intervention period; and estimating an overlap between the selected cells and the other cells of the plurality of cells based on the required effective radio coverage contribution and the effective radio coverage contribution of the selected cells. It is to be understood that the method according to the second aspect may be seen as subsequently implementing some embodiments of the first method on the same plurality of cells and selected cells and further comprising the step of estimating the overlap. Therefore, the additional features described hereinabove relative to the method according to the first aspect apply similarly to the method according to the second aspect.

In some embodiments of the method according to the second aspect estimating the overlap comprises calculating a difference between the effective coverage radio contribution and the required effective radio coverage contribution.

In a third aspect, the presently disclosed subject matter provides a method of determining a radio configuration of one or more selected cells among a plurality of cells of a cellular telecommunication network, the plurality of cells providing telecommunication services to a service area and being set with one or more cell configuration parameters enabling a cell rating for mobile stations in the service area. The method comprises setting a target overlap between the selected cells and the other cells of the plurality of cells; configuring the selected cells with a given radio configuration; estimating the overlap between the selected cells and the other cells of the plurality of cells according to the method of the second aspect previously described; and iterating the configuring and the estimating so as to determine a target radio configuration of the selected cells approaching the target overlap. It is understood that the target overlap may be attained, or an overlap sufficiently close to the target overlap may be attained.

In a fourth aspect, the presently disclosed subject matter provides a method of creating a list of one or more target radio configurations of one or more selected cells among a plurality of cells of a cellular telecommunication network, the plurality of cells providing telecommunication services to a service area and being set with one or more cell configuration parameters enabling a cell rating for mobile stations in the service area. The method comprises determining a list of one or more target overlaps between the selected cells and the plurality of cells; determining the list of one or more target radio configurations of the selected cells respectively, achieving the list of target overlaps according to the method of the third aspect previously described.

In a fifth aspect, the presently disclosed subject-matter provides a method of configuring one or more selected cells among a plurality of cells of a cellular telecommunication network, the plurality of cells providing telecommunication services to a service area and being set with one or more cell configuration parameters enabling a cell rating for mobile stations in the service area. The method comprises creating a list of target configurations of the selected cells respectively, achieving target overlaps from a list of target overlaps according to the method of the fourth aspect previously described; and setting the radio configuration of the selected cells according to the radio configurations listed in the list of target radio configurations.

In a sixth aspect, the presently disclosed subject matter provides a method of configuring one or more selected cells among a plurality of cells of a telecommunication network, the plurality of cells providing telecommunication services to a service area and being set with one or more cell configuration parameters enabling a cell rating for mobile stations in the service area. The method comprises setting a target overlap between the selected cells and the other cells of the plurality of cells; configuring the selected cells with a given radio configuration; estimating the overlap between the selected cells and the other cells of the plurality of cells according to the method of the second aspect previously described; and iterating the configuring and the estimating so as to configure the selected cells with a radio configuration approaching the target overlap. It is understood that the term 'approaching' may refer to achieving exactly the target overlap or to attaining an overlap sufficiently close to the target overlap.

In a seventh aspect, the presently disclosed subject matter provides a method of configuring one or more selected cells among a plurality of cells of a telecommunication network, the plurality of cells providing telecommunication services to a service area and being set with one or more cell configuration parameters enabling a cell rating for mobile stations in the service area. The method comprises setting a target radio configuration of the selected cells; setting an overlap limit for an overlap between the selected cells and the other cells of the plurality of cells; configuring the selected cells with a given radio configuration; estimating the overlap between the selected cells and the other cells of the plurality of cells according to the method according to the second aspect previously described; and iterating the configuring and the estimating so as to configure the selected cells with a radio configuration approaching the target radio configuration while complying with the overlap limit. It is understood that the term 'approaching' may refer to achieving exactly the target overlap, or to attaining an overlap sufficiently close to the target overlap.

In some embodiments of the methods according to any one of the third, fourth, fifth, sixth or seventh aspect, the radio configuration of the selected cells comprises one or more parameters affecting the properties of the radio broadcasted by the selected cells.

In some embodiments of the methods according to any one of the third, fourth, fifth, sixth or seventh aspect, the radio configuration of the selected cells comprises broadcast power and antenna position.

In a eighth aspect, the presently disclosed subject matter provides a system for obtaining information on radio coverage contribution of one or more selected cells among a plurality of cells of a cellular telecommunication network, the plurality of cells providing telecommunication services to a service area and being set with one or more cell configuration parameters enabling a cell rating for mobile stations in the service area. The system comprises a cell configuration manager configured to change at least one cell configuration parameters of at least one of the plurality of cells during an intervention period in order to affect a rate of the selected cells in the cell rating for the mobile stations in the service area; a network performance monitor configured to monitor traffic events communicated using the selected cells during the intervention period; and a computing platform configured to determine the radio coverage contribution information by correlating the monitored traffic events and the change of parameters.

In some embodiments of the system according to the eighth aspect, the network performance monitor is further configured to monitor traffic events communicated using the plurality of cells so as to determine a total amount of traffic events communicated using the plurality of cells during the intervention period and the computing platform is configured to determine the radio coverage contribution information based on an amount of traffic events communicated using the selected cells and the total amount of traffic events communicated using the plurality of cells.

In some embodiments of the system according to the eighth aspect, the computing platform is configured to determine the radio coverage contribution information as a ratio between the amount of traffic events communicated using the selected cells and the total amount of traffic events communicated using the plurality of cells of the service area.

In some embodiments of the system according to the eighth aspect, the cell configuration manager is connectable to a radio network controller of the cellular telecommunication network and is configured to change the one or more cell configuration parameters through the radio network controller.

In some embodiments of the system according to the eighth aspect, the network performance monitor is connectable to a cell performance monitoring system of the cellular telecommunication network; the cell performance monitoring system collecting performance indicators from the cells of the cellular telecommunication system and the network performance monitor is configured to monitor traffic events based on the performance indicators collected by the cell performance monitoring system.

In some embodiments of the system according to the eighth aspect, the cell performance monitoring system is a part of a radio network controller or of an operation support system of the cellular telecommunication network.

In some embodiments of the system according to the eighth aspect, the network performance monitor is configured to monitor traffic interfaces.

In some embodiments of the system according to the eighth aspect, the cell configuration manager is configured to change the at least one cell configuration parameters of at least one of the plurality of cells so as to make the selected cells the least rated cells during the intervention period and wherein the radio coverage contribution information comprises a required effective radio coverage contribution of the selected cells representing the ratio of the mobile stations in the service area that are dependent on the radio coverage of the selected cells.

In some embodiments of the system according to the eighth aspect, the cell configuration manager is configured to change at least one cell configuration parameters of the at least one of the plurality of cells so as to make the selected cells the most rated cells during the intervention period and wherein the radio coverage contribution information comprises an effective radio coverage contribution of the selected cells representing the ratio of the mobile stations in the service area that have radio reception from the selected cells.

In some embodiments of the system according to the eighth aspect, the computing platform is configured to estimate an overlap between the selected cells and the other cells of the plurality of cells by calculating a difference between the effective radio coverage contribution and the required effective coverage contribution of the selected cells.

In a ninth aspect, the presently disclosed subject matter provides a cellular telecommunication network comprising the system to any embodiments of the system according to the eight aspect and/or configured to implement the method according to any of the first to seventh aspects.

In the following, the term substantial overlap between cells may refer to an overlap between the radio coverage areas of the cells that exceed a predetermined threshold. For example, the threshold may be of 99%. Further, the term "coverage hole" may be understood as referring to an area in which a mobile station would not be able to be provided telecommunication service. The term "without causing substantial coverage hole" may be understood as referring to causing an amount of coverage holes inferior to a predetermined threshold i.e. a low amount of mobile stations would not be provided with telecommunication services. Furthermore, the term "deactivated" and its derivatives may be used as a synonym for "switched off".

BRIEF DESCRIPTION OF THE DRAWINGS

For better understanding of the present invention, reference will now be made by way of non limiting examples to the accompanying drawings in which similar parts are likewise numbered, and in which:

FIG. 9A: shows a flow chart illustrating the operation of RCA system for obtaining the Prime-ERCC of a selected cell in accordance with an embodiment of the present invention.

FIG. 9B: shows a flow chart illustrating the operation of RCA system for obtaining the Supplement-ERCC of a selected cell in accordance with an embodiment of the present invention.

DETAILED DESCRIPTION OF EMBODIMENTS

The present invention is described with reference to UMTS (Universal Mobile Telecommunications System) technology. The present invention can be equally applied to any cellular telecommunication system, providing communication services for a mobile station capable of moving between cells such as GSM, CDMA, LTE and Wimax.

Figure 1:
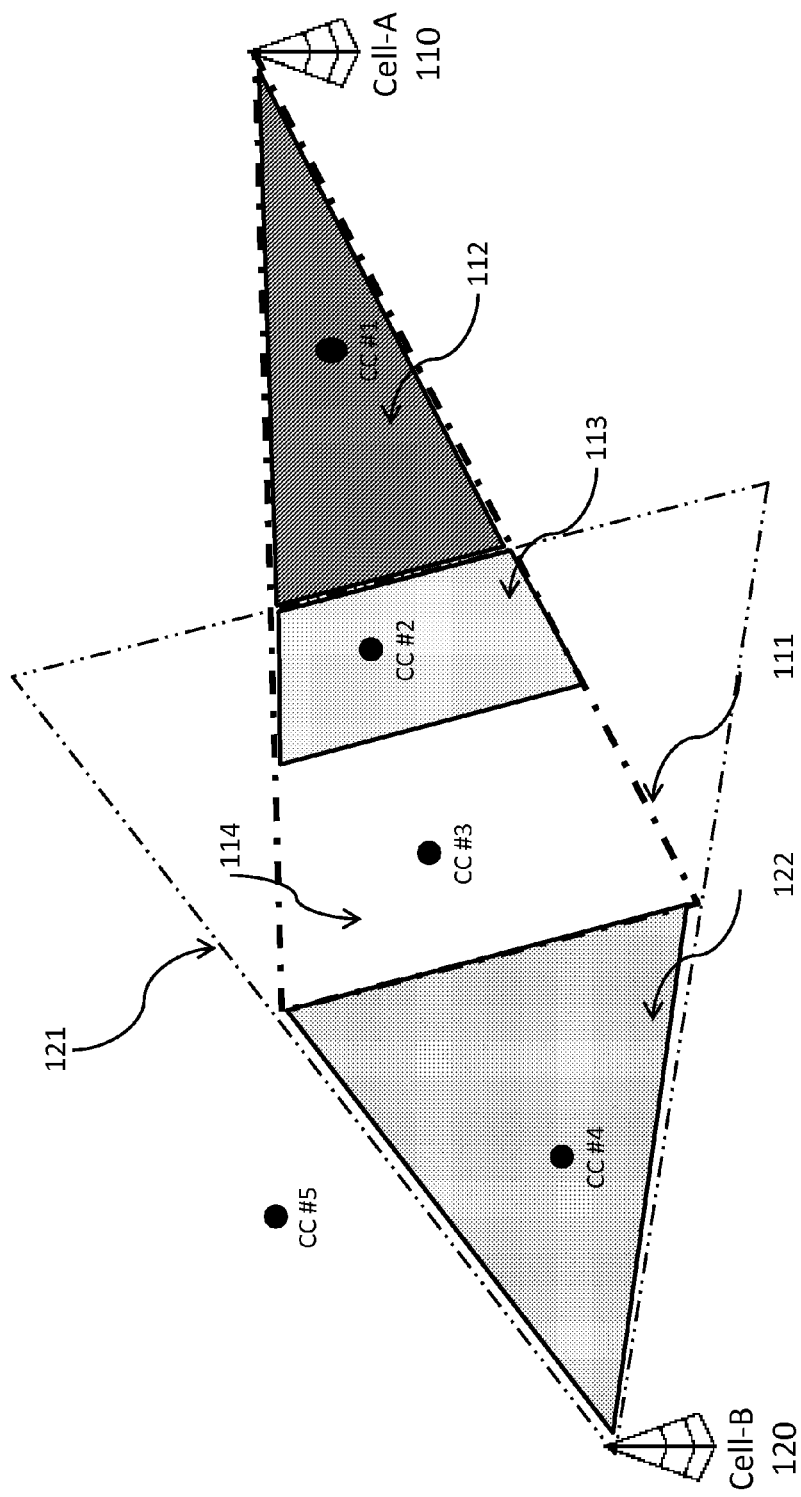
FIG. 1: illustrates a scenario of two cells providing radio coverage to a Service Area (SA) illustrating principles of the radio coverage of cells.

FIG. 1 illustrates a scenario of two cells providing radio coverage to a Service Area (SA) and illustrates a fundamental aspect of the radio coverage of cells. Cellular telecommunication networks are designed to support seamless communication throughout the network, even while MSs are moving between the radio coverage areas of one cell to another. Therefore, networks are designed so that there will be an overlap between the radio coverage of co-located cells.

Coverage Coordinate (CC)

A Coverage Coordinate (CC) is a specific coordinate in space. A CC may optionally be reached by the radio transmissions of one or more cells. The radio transmission from each cell at a CC may be measured separately for each cell. A magnitude of a CC may range from cubic-millimeters to cubic-meters. For each CC it is possible to perform a Cells Radio Measurement (CRM) which measures the radio transmission signals broadcasted by the networks' cells. These CRMs may be ordered based on various parameters, such as, and without being limited, radio strength (dBm), radio signal to noise ratio (dB) and the like.

The radio transmission signals that reach a CC may be measured for example, without intention of being limited, by a cellular Mobile Station (MS) also known as a Cell-Phone, radio spectrum analyzer, and any other radio measurement equipment. It should be understood that for each CC it is possible to perform a CRM, and it is also possible to perform a CRM for any random location in space without knowing its CC. For example, it is possible to obtain the CRM performed by MSs in a network, without knowing their precise location (CC).

When examining the radio coverage provided by a Selected-Cell which optionally has other neighboring cells, it is reasonable to categorize each CC into one of four CC types with respect to the Selected-Cell and neighboring cells:
  i. CC-Type 1: Only the Selected-Cells' radio transmission signals reach that CC and may be measured in that CC. Therefore, without the radio coverage provided by the Selected-Cell, no radio transmission signals will reach and be measured in that CC, which is also known as a radio coverage hole.
  ii. CC-Type 2: The Selected-Cell and at least one or more neighboring cells' radio transmission reaches and may measured in that CC. The Selected-Cell is measured as the best (provides the best radio conditions) in that CC, out of all of the other neighboring cells measured. It should be noted that if the Selected. Cell were to stop broadcasting, the radio transmission of the other neighboring cells would still be reached and may be measured in that CC, and there will not be any radio coverage holes in that CC.
  iii. CC-Type 3: The Selected-Cell and at least one or more neighboring cells' radio transmission signals reaches and may be measured in that CC. The Selected-Cell is not measured as the best (one or more other cells provide better radio conditions). It should be noted that if the Selected-Cell were to stop broadcasting, the radio transmission of the other cells would still reach and may be measured in that CC.
  iv. CC-Type 4: The Selected-Cell radio transmission signals do not reach and may not be measured in that CC. The radio transmission signals of other cells CC might still reach that CC.

It should be understood that the four types of CC-Types represent the radio influence on a specific CC that the Selected-Cell has with respect to other cells in the SA.

The Area of Coverage of a Cell

The Area of Coverage (AoC) is the physical area (3D) reached by the radio transmission signals broadcasted by a cell and in which optionally the radio transmission signals may be measured. Therefore, the AoC of a cell is a collection of all of the CCs reached by the cells' radio transmission signals and in which the radio transmission signals could be measured. An AoC of a cell may be characterized by the amount of its CCs. Each of the CCs that are a part of the AoC of a Selected-Cell could be one of types CC-Type 1-3, but could not be of CC-Type-4, since the radio transmission of the specific cell may not be measured in the CC.

The AoC of a cell and the CRM of each CC within said AOC, is a function of many factors, for example:
  i. radio transmission power, tilt, azimuth, frequency
  ii. Geographical topology (hills and valleys)
  iii. Radio abstracting or reflecting objects Service Area (SA)

A Service Area (SA) 111+121 is a geographical area which is defined as the union of all AoCs of a predefined group of cells. By selecting different groups of cells, different SA are defined. It should be understood, that the SA does not include areas of radio coverage holes by definition.

Further, it should be understood that the method described in the present disclosure provides relative coverage contribution information between selected cell(s) and other cells in a given service area.

In order to analyze, partially or globally, a cellular telecommunication network, the present method may be performed successively on several groups of one or more cells with regard to different service areas. The selection of the cell(s) on which the method should be implemented, and of the service area with respect to which the method should be implemented, may depend on the application i.e. on the type of information that is to be retrieved.

In the following, the term "neighbors" refers to cells that are geographically close to a reference cell or to cells that are listed in the neighbor list broadcasted by the reference cell.

For example, in the case of Energy Saving application in which the Required-ERCC of selected cell(s) with respect to a service area may be retrieved i.e. the probability that no other cell of the service area than the selected cell(s) covers a mobile station in the service area, it may be possible to perform, in a first step, a global scan of the network by successively carrying out the present method on every cell of the cellular network. For example, the first step may be performed by successively defining each cell of the network as the selected cell, the corresponding service area comprising said cell and the neighboring cells i.e. cells in the vicinity of the selected cell(s), for example as listed in the neighbor list broadcasted by the selected cell(s). The first step may in fact provide a list of probabilities that each selected cell be switched off without causing a coverage hole, if the other cells of the corresponding service area are switched on. In some cases, for example when the service areas corresponding to two or more successively selected cells comprise common cells (said selected cells are in proximity) and said selected cells have been determined as being "switchable" in the first step, it may be interesting to perform, in a second step, a more precise analysis to determine if said selected cells may be switched off at the same time without causing a coverage hole.

The second step may be performed by successively carrying out the present method on groups of selected cells in order to determine if several cells may be switched off at the same time without causing a coverage hole. For example, the second step may be performed by successively defining groups of two or more cells (preferably cells that have been determined as switchable in the first step and that are in proximity to each other) as selected cells, the service area comprising said selected cells and all the neighbors of the selected cells. In another embodiment of the second step, the service area may comprise the selected cells and some of the neighbors of said selected cells based on the result of the first global scan. For example, when two or more cells in proximity have been found to be fully overlapped by their neighbors (i.e. said two or more cells have a Required-ERCC substantially equal to zero with respect to their respective neighbors), then the second step may be performed on the group of said two or more cells defined as the selected cells, the corresponding service area being defined as the union of the neighbors of the selected cells. In a further embodiment, said corresponding service area may be limited to the union of the neighbors of each of the two or more selected cells that respectively have at least a predefined level of overlapping with each selected cell. In other words, the neighbors that do not overlap with the selected cells are excluded from the corresponding area. The level of overlapping between a cell and a selected cell may be determined in the first step by analyzing how the traffic is redistributed between the cells of the service area when cell configuration parameters are changed. For example, when making the selected cell the least rated cells in the service, the level of overlapping between a cell and the selected cell may be determined by calculating an increase in the traffic communicated through said cell with respect to a situation in which the cell configuration parameters are not changed. In fact, the cells of the service area that overlap with the selected cells are the cells whose traffic is affected by the change of parameters.

From a general point of view, the selection of the service area within a given service area of the selected cell(s) may be done based on various considerations and depending on various application needs.

For instance, in some cases it would be useful to define the SA by the neighbors of the Selected Cells. In other cases it might be useful to define the SA by the highest ranked neighbors, e.g. neighboring cells that had the most handovers with the Selected Cell. In other cases it may be needed to define the SA by only one other neighbor cell to analyze the Selected Cells with respect to that neighbor cell.

For example, as described hereinabove, for Energy Saving applications it would be useful to define the SA by the neighbors of a Selected Cell. After analyzing several cells it would be useful to take several neighboring cells and define them as the Selected Cells and to analyze them with respect to the union of all of the cells that were in the SA in the analysis of each Selected cell if these neighboring cells were found as having at least a predetermined level of overlapping with the Selected Cell.

Generally, the level of overlapping between a cell and selected cells may be determined by analyzing how the traffic is redistributed between the cells of a service area when cell configuration parameters are changed according to the method of the present disclosure. For example, when making the selected cells the least rated cells in the service, the level of overlapping between a cell and the selected cells may be determined by calculating an increase in the traffic communicated through said cell with respect to a situation in which the cell configuration parameters are not changed.

However, for the sake of clarity, the method is hereinafter described with regard to a single selected cell in a service area comprising the selected cell and a neighboring cell (Cell-A and Cell-B).

FIG. 1 illustrates a SA 111+121 which is constructed by two cells; Cell-A 110 and Cell-B 120. The AoC of each cell is indicated by a triangle, whereas Cell-B's 120 AoC is the entire big triangle with dashed boarder 121 and Cell-A's 110 AoC is the entire triangle with dashed border 111. The AoC 111 of Cell-A 110 and the AoC 121 of Cell-B 120 overlap in a certain area which is the overlapping of the two triangles 111,121.

It should be noted that the representation of the Area of Coverage (AoC) of a cell as a 2D triangle is an idealization of the real 3D physical Area of Coverage (AoC), and is done for the purpose of simplifying the illustration and is provided as a visual aid. In reality, the radio coverage of a cell is non linear and does not have to be continuous.

The figure also illustrates five different sample CCs distributed in the SA.

CC #1 is in a specific part of the AoC 111 of Cell-A 110, this area is the gray triangle 112 within the dashed triangle 111 (the AoC 111 of Cell-A 110). Additionally, CC #1 is not in the AoC 121 of Cell-B 120. With respect to Cell-A 110, CC #1 is of CC-Type-1 and with respect to Cell-B 120, CC #1 is of CC-Type-4.

CC #2 is in a specific part of the AoC 111 of Cell-A 110, which is the bright gray trapezoid 113 within the dashed triangle 111. CCs that are in area 113 are of CC-Type-2 with respect to Cell-A 110 and of CC-Type-3 with respect to Cell-B. Therefore, the radio transmission provided by Cell-A 110 in area 113 would be measured as better than the radio transmission provided by Cell-B 120 in area 113. Therefore, CC #2 is of CC-Type-2 with respect to Cell-A 110 and CC-Type-3 with respect to Cell-B 120.

CC #3 is in a specific part of the AoC 111 of Cell-A 110, which is the white trapezoid 114 within the dashed triangle 111 (which is the AoC of Cell-A 110). CCs that are in area 114 are of CC-Type-3 with respect to Cell-A 110 and CC-Type-2 with respect to Cell-B 120. Therefore, the radio transmission provided by Cell-B 120 in area 114 would be measured as better than the radio transmission provided by Cell-a 110 in area 114. CC #3 is of CC-Type-3 with respect to Cell-A 110 and CC-Type-2 with respect to Cell-B 120.

CC #4 is in a specific part of the AoC 121 of Cell-B 120 which has no overlapping 122 with the AoC 111 of Cell-A 110. CCs that are in area 122 are of CC-Type-4 with respect to Cell-A 110 and CC-Type-1 with respect Cell-B 120. Therefore, the radio transmission provided by Cell-B 120 in area 122 is the only one measured. Therefore, CC #4 is of CC-Type-4 with respect to Cell-A 110 and CC-Type-1 with respect to Cell-B 120.

CC #5 is not in the AoC of any cell and therefore not in the SA and is of CC-Type-4 with respect to both Cell-A 110 and Cell-B 120.

Classification of AoC of a Selected-Cell

The AoC of a Selected-Cell in a SA could be divided into three AoC types, in accordance with the three types of CCs as described above;

i. Required-AoC: The collection of all of the CCs in the SA of CC-Type-1 with respect to the Selected-Cell. Only the radio transmission of the Selected-Cell reaches and could be measured in this type of AoC. This is illustrated in the gray triangle 112 which is the Required-AoC of Cell-A 110, and a part of the AoC 111 of Cell-A 110.

In other words, the Required-AoC of Cell-A in the service area formed by Cell-A 110 and Cell-B 120 is illustrated by the gray triangle 112 in FIG. 1.

ii. Prime-AoC: The collection of all of the CCs in the SA of CC-Type-2 with respect to the Selected-Cell. The radio transmission of the Selected-Cell reaches and may be measured in this type of AoC, along with the radio transmission of neighboring cells in the SA, but the radio provided by the Selected-Cell is considered the best measured. This is illustrated in the gray trapezoid 113 which is the Prime-AoC of Cell-A 110, and a part of the AoC 111 of Cell-A 110. In other words, the Prime-AoC of Cell-A 110 in the service area formed by Cell-A 110 and Cell-B 120 is illustrated by the gray trapezoid 113 on FIG. 1.

iii. Supplement-AoC: The collection of all of the CCs in the SA of CC-Type-3 with respect to the Selected-Cell. The radio transmission of the Selected-Cell reaches and may be measured in this type of AoC, along with the radio transmission of neighboring cells in the SA, but the radio provided by the Selected-Cell is not considered to be the best measured. This is illustrated in the white trapezoid 114 which is the Supplement-AoC of Cell-A 110, and a part of the AoC 111 of Cell-A 110. In other words, the Supplement-AoC of Cell-A 110 in the service area formed by Cell-A 110 and Cell-B 120 is illustrated by the white trapezoid 114 on FIG. 1.

Approximation of the AoC of a Cell

It should be understood that it is impossible to perform a CRM for each CC in a SA and therefore, it is impossible to measure the actual AoC of a cell. This is due to the fact that the normal scale a cell AoC is measured in cubic-kilometers. Therefore, it is impossible to precisely measure and indicate the actual AoC of a cell in terms of geographical outreach of the cells' radio transmissions. However, it is possible to perform the CRM at certain CCs in the SA, which may be considered as a sampling group and that try to obtain a partial approximated measurement of the AoC of a cell. For example, this may be done by employing a drive test which measures the radio transmission of the networks' cells at specific locations, and processing the results in correlation to radio propagation models.

When analyzing the radio coverage provided by a cell to a SA, since it is impossible to obtain the real AoC and its subgroup, the AoC approximation may provide a very inaccurate measurement of the real AoC.

It is still reasonable to have other calculations based on the CRMs measured in the AoC of a cell.

The Radio Coverage Contribution (RCC) of a Cell to a SA

The Radio Coverage Contribution (RCC) of a cell to a SA is a ratio between the amount of CCs in the Selected-Cells' AoC, out of the total CCs in the SAs' AoC or could be the amounts themselves.

The RCC of a Selected-Cell in a SA could be divided into three RCC types, in accordance with the three types of CCs as described above;
  i. Required-RCC—the amount of CCs in the Selected-Cells' Required-AoC or the ratio of that amount, out of the total amount of CCs in the SAs' AoC.
  ii. Prime-RCC—the amount of CCs in the Selected-Cells' Prime-AoC or the ratio of that amount, out of the total amount of CCs in the SAs' AoC.
  iii. Supplement-RCC—the amount of CCs in the Selected-Cells' Supplement-AoC or the ratio of that amount, out of the total amount of CCs in the SAs' AoC.

For example, if in SA 111+121 there are a total of two hundred (200) CCs and in one hundred of these CCs, it is possible to measure the radio transmission of Cell-A 110. Therefore, the RCC of Cell-A 110 to the SA 111+121 is calculated by:

$$\text{Amount\_RCC}_{Cell\text{-}A\_to\_SA} = \text{Total\_CCs}_{Cell\_A\_AoC} = 100$$

$$RCC_{Cell\text{-}A\_to\_SA} = \frac{\text{Total\_CCs}_{Cell\_A\_AoC}}{\text{Total\_CCs}_{SA\_AoC}} = \frac{100}{200} = 50\%$$

If out of the one hundred (100) CCs measuring Cell-A 110, twenty (20) CCs are of CC-Type 1 with respect to Cell-A 110, then the Required-RCC of Cell-A 110 to the SA is calculated by:

$$\text{Amount\_Required\_RCC}_{Cell\text{-}A\_to\_SA} = \text{Total\_CCs}_{Cell\_A\_Required-AoC} = 20$$

$$\text{Required\_RCC}_{Cell\text{-}A\_to\_SA} = \frac{\text{Total\_CCs}_{Cell\_A\_Required-AoC}}{\text{Total\_CCs}_{SA\_AoC}} = \frac{20}{200} = 10\%$$

If out of the one hundred (100) CCs measuring Cell-A 110, sixty (60) CCs are of CC-Type 2, then the Prime-RCC of Cell-A 110 to the SA is calculated by:

$$\text{Amount\_Prime\_RCC}_{Cell\text{-}A\_to\_SA} = \text{Total\_CCs}_{Cell\_A\_Prime-AoC} = 60$$

$$\text{Prime\_RCC}_{Cell\text{-}A\_to\_SA} = \frac{\text{Total\_CCs}_{Cell\_A\_Prime-AoC}}{\text{Total\_CCs}_{SA\_AoC}} = \frac{60}{200} = 30\%$$

If out of the one hundred (100) CCs measuring Cell-A 110, twenty (20) CCs are of CC-Type 3, then the Supplement-RCC of Cell-A 110 to the SA is calculated by:

$$\text{Amount\_Supplement\_RCC}_{Cell\text{-}A\_to\_SA} = \text{Total\_CCs}_{Cell\text{-}A\_Supplement-AoC} = 20$$

$$\text{Supplement\_RCC}_{Cell\text{-}A\_to\_SA} = \frac{\text{Total\_CCs}_{Cell\text{-}A\_Supplement-AoC}}{\text{Total\_CCs}_{SA\_AoC}} = 10\%$$

Additionally, the RCC could be calculated by the sum of all of its subgroups:

$$RCC_{Cell\text{-}A\_to\_SA} = \text{Required\_RCC}_{Cell\text{-}A\_to\_SA} + \text{Prime\_RCC}_{Cell\text{-}A\_to\_SA} + \text{Supplement\_RCC}_{Cell}$$

$$\text{Amount\_RCC}_{Cell\text{-}A\_to\_SA} = \text{Amount\_Required\_RCC}_{Cell\text{-}A\_to\_SA} + \text{Amount\_Prime\_RCC}_C + \text{Amount\_Supplement\_RCC}_{Cell\text{-}A\_to\_SA}$$

Down-Sampling of CC

Since performing a CRM in every CC in the SA is impossible, by assuming uniform distribution of CCs through the SA, it is possible to sample subgroups of CCs through the SA and still obtain an accurate calculation of the RCC and the Required, Prime and Supplement RCCs of a cell to a SA. This is due to the fact that the ratio between the RCC and the Required, Prime and Supplement RCC is preserved even under down-sampling of CCs through the SA.

Using the example above, and assuming a uniform distribution of CCs through the SA, by sampling the CRM of every 10th CC in the SA the same RCC and Required, Prime and Supplement RCC of Cell-A to the SA (the results would be in ratio form only) would be obtained.

MS Classifying CC-Types of Cells in SA

A MS could be seen as occupying a specific CC, whose location in space might be unknown. Additionally, a MS constantly performs a CRM in that CC and therefore the MS can constantly classify each of the measured cells into their respective CC-Types. By obtaining only the CC-Type of the Selected-Cell as measured by a group of MSs in a given SA, it is possible to calculate an approximation of the real RCC and its subgroups of the Selected-Cell, to a given SA which the cell is a part of.

In other words, a mobile station located at a CC of a service area performs a local radio measurement of the cells that cover the CC. This measurement may enable to determine the CC-type of the CC with respect to a selected cell. Therefore, by obtaining the local radio measurements performed by a group of mobile stations in the service area, it may be possible to estimate the RCC and the RCC subgroups of the Selected Cell as perceived by the mobile stations i.e. obtain the ERCC and ERCC subgroups, In fact, the MS may be regarded as providing a sampling of the CC of the service area. As described in more detail hereinafter, it is possible to retrieve information on the CC-type of the CC occupied by a mobile station by intervening on the configuration of the cells thereby affecting the rating of the cells for the mobile stations.

It should be understood, that for the purpose of the calculation of the approximated RCC and its subgroups, the location of the MSs in the SA is not required. By obtaining the CC-Type of a Selected-Cell from a sufficient amount of MS in a SA for long period of time, it is possible to obtain a better approximation of the real RCC and its subgroups.

Effective-RCC, and the Effective-Required, Effective-Prime and Effective-Supplement RCCs Since MSs are not uniformly distributed along a given SA, the RCC and its subgroups calculated by obtaining the CC-Type of MSs, as described above, could be seen as the Effective-RCC (ERCC), and the Required, Prime and Supplement ERCCs. The Effective-RCC (ERCC) and its subgroups are the RCCs of a given cell which is a part of a SA, as perceived by the MSs in the SA.

More specifically, the ERCC represents the radio conditions experienced by the MSs in the SA as opposed to the real RCC which represents the radio conditions existing in the SA (with no relation to the MS).

It is common for network operators to measure the Quality of Service (QOS) provided by the network to their subscribers, based on measuring various parameters (such as Key Performance Indicators KPI) which are indicative to the service conditions as perceived by MSs in the network. It is less common and less feasible to measure the QOS experienced by subscribers based on information that was not originated by their MSs. This fact is also related to the reason why it is impossible to measure precisely the real AoC of a cell.

In other words, since the collection of actual QoS results by drive tests measurements is unpractical, the QoS is generally determined based on information originated by the MS.

Figure 2:
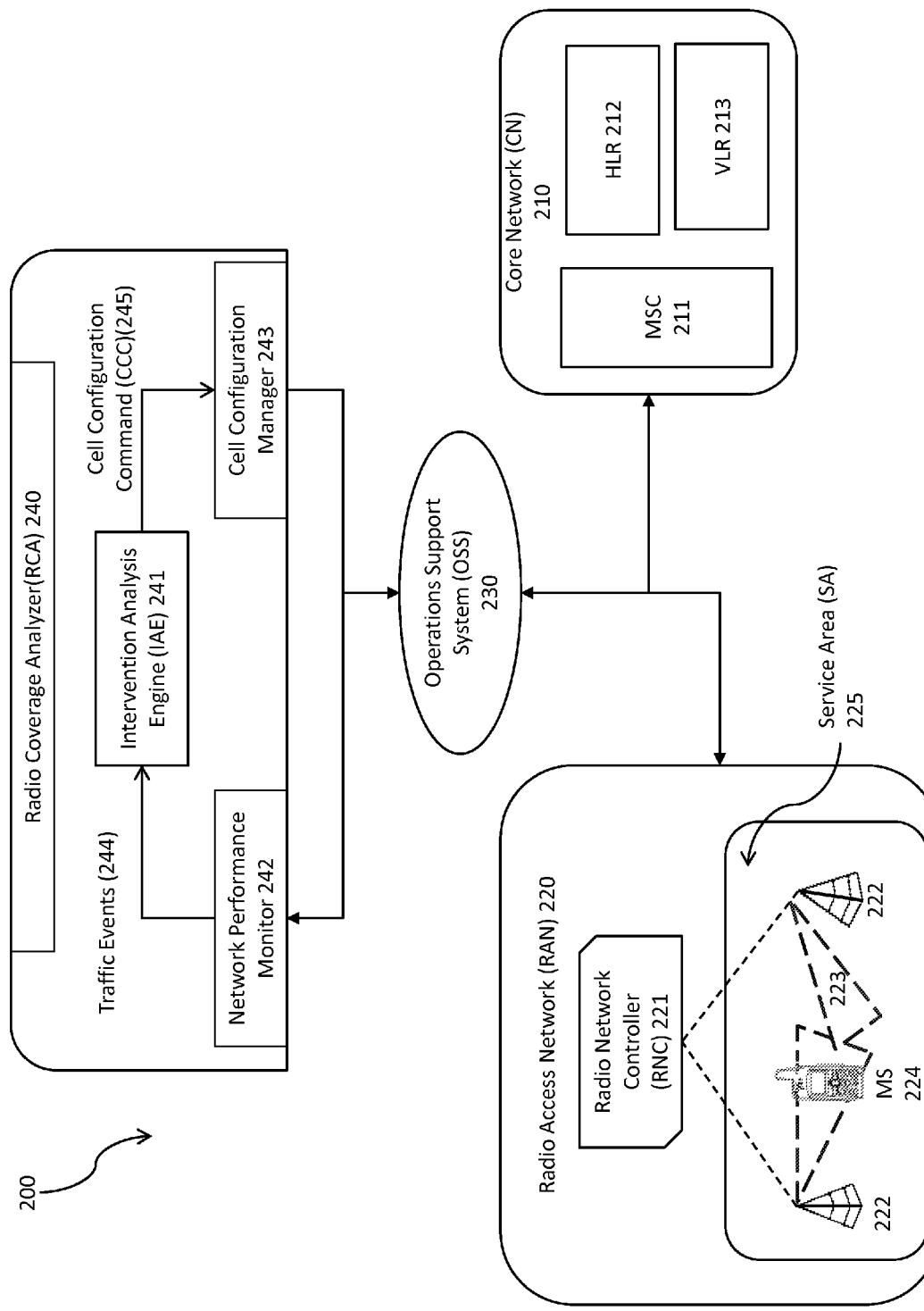
FIG. 2: illustrates a scheme of a Cellular Telecommunication Network including the Radio Coverage Analyzer (RCA) system in accordance with an embodiment of the present invention.

FIG. 2 shows a Cellular Telecommunication Network including the Radio Coverage Analyzer (RCA) system in accordance with the preferred embodiment of the present invention;

Cellular telecommunications networks 200 could be roughly viewed as consisting of a Core Network (CN) 210 for switching purposes and a Radio Access Network (RAN) 220 which includes a multitude of Radio Base Stations (RBS) 222 providing service to Mobile Stations (MS) 224. Each RBS 222 includes a plurality of so-called cells which provides services to a desired area, mainly called Service Area (SA) 225. The Area of Coverage (AoC) 223 of a given cell may overlap with AoC 223 of other cells of the same RBS or neighboring RBSs. Additionally, each cell constantly broadcasts a beacon or control channel. In UMTS networks, this is known as the Broadcast Control Channel (BCCH). This control channel carries information that MSs monitors in order to synchronize and access the network. The control channel usually broadcasts system information about the cell and various parameters that affect the rating of the cell and are required by the MS to determine whether or not it should or could camp on that cell.

Idle MS Procedure for Selecting a Cell in a SA

An Idle MS is one that is not actively involved in bi-directional communication with the network. During the idle period, the MS periodically measures the radio signals and monitors additional parameters from the broadcast channel sent from cells in its proximity and determines which cell can provide the best service based on predefined conditions and formulas. When a MS is powered-on, initially, it will start the Initial Cell Selection procedure. The MS scans all radio frequency channels in the permitted bands to find a suitable cell. Once a suitable cell is found, this cell is selected as the current camping cell.

Whenever the MS has camped on a cell, it will continuously search for better cells as candidates for potential camping cells, if found, to be the best cells. To do this, the MS needs to measure neighboring cells, which are indicated in the neighbor cell list broadcasted by the camping cell. This procedure is also known as the Cell Reselection procedure in UMTS networks, and is performed periodically and continuously as long as the MS is in the idle state. During the Cell Reselection process, the MS assign a rating to each measured cell. The rating is based on the measured signal strength and additional parameters that could be configured per cell by the network operator and is broadcast by each cell Broadcasting Channel, for example, in UMTS networks; such a parameter could be the Qoffset which could increase or decrease the rating of a cell in certain scenarios.

In other words, a cell rating may be performed for selecting on which cell an idle mobile station camps, initiates and/or receives telecommunication services. The cell rating may be performed among the cells that cover the location of the idle mobile station. The cell rating may be performed by the idle mobile station based on cell configuration parameters broadcast by the cells covering said location of the idle mobile station i.e. based on control channel parameters. The cell rating may be performed when switching the mobile station on and regularly afterwards in order to detect if a change of camping cell is needed. The cell rating for idle mobile stations may comprise assigning a rate to all cells that are able to communicate with the mobile station i.e. the cells that cover the mobile station location.

Active MS Procedure for Selecting a Cell in a SA

When the idle MS initiates or receives a service (i.e. voice call, text message and any other service available in the network), the initial radio communication is done through the cell on which the MS camped on prior to the service initiation.

After the service is initiated, the MS periodically sends the Radio Network Controller (RNC) radio measurements of the current communication cell and neighboring cell. This information is used by the RNC to instruct the MS whether to continue communicating thru current cell/cells or to perform a handover to better neighboring cell/cells. For example, this procedure is known as softer/soft/hard handover in UMTS network. The RNC will select the best cell/cells available separately for each active MS based on radio measurement sent to the RNC.

Additionally, configurable parameters that for example could increase the rating of some cells over others. An example of such a parameter is the IndividualOffset in UMTS network.

In other words, a cell rating may be performed for selecting through which cell an active mobile station communicates. The cell rating may be performed during an active session in order to determine if a handover from a current cell is needed. The rating may be performed among the cells that cover the location of the active mobile station or among a list of cells provided for example by the current cell through which the mobile station currently communicates. The cell rating may be performed by the cellular telecommunication network (for example at the level of the RNC or in the BTS (in cases in which BTS can communicate among themselves autonomously and make decisions, such as with LTE technology) based on radio information sent by the MS and/or on cell configuration parameters of the cells that cover the location of the mobile station an/or on the cell configuration parameters of the cells of the list of cells. The cell rating for active mobile stations may comprise assigning a rate to all cells that are able to communicate with the active mobile station i.e. the cells that cover the active mobile station location.

It is usually the case that, during an active session the RNC controls the cells used to carry out the communication as opposed to the MS idle state where the idle MS controls the selection of the best camping cell.

In other words, a cell rating may be performed for both idle and active mobile stations in order to decide on which cell radio communication should be established or continued. The cell rating for idle mobile stations may be performed by the idle mobile stations based on cell configuration parameters broadcast by the cells i.e. parameters of the control channel broadcast by the cells and received by the idle mobile stations. The cell rating for active mobile stations may be performed by the cellular telecommunication network based on cell configuration parameters stored by the cellular telecommunication network i.e. parameters of the cell configuration.

During idle state of the mobile station, the cellular telecommunication network does not generally intervene with the decision of the mobile station regarding the choice of the camping cell among the cells of the service area. Alternatively, in active state of the mobile station, the cellular telecommunication network generally intervenes in the decision regarding the choice of the communicating cell among the cells of the service area. For example, the cellular telecommunication network may intervene through modifying parameters of the cell configuration affecting the rating of the cells for the active mobile stations as described in further detail below.

Cell Configuration

Each cell in the RBS 222 has its own configuration, such as radio frequency, broadcast power, antenna tilt, and assigned neighboring cells. The cell configurations parameters can be edited by the Radio Network Controller (RNC) 221 which controls its assigned RBSs 222 or through the networks Operations Support System (OSS) 230, the reconfiguration are implemented in the cell in real-time. Editing of cell configuration parameters enables the network operator to optimize the operation or functionalities of its cells to better suit the network needs.

Generally, one may look on a group of cell configuration parameters as affecting the cell broadcast information that is used by all idle MSs. Such cell parameters could affect the cell reselection process and the best cell for camping. This will affect the cell through which the idle MSs will initiate or receive services from. An example of a cell parameter that can affect the cell through which idle MSs initiates or receives services is the Qoffset in UMTS networks. The Qoffset influences the MS cell reselection process by adding a virtual offset to the physical radio signal measurement as measured by the idle MS and could make the idle MS camp on a cell that does not have the best physical radio signal. In other words, certain cell configuration parameters are broadcast by the cells and enable the cell rating for idle mobile stations performed by the idle mobile stations. Further, a change of said parameters may affect the cell rating performed by idle mobile stations. A change of at least one cell configuration parameter of a cell that affects the cell rating for idle mobile stations may be performed through the RNC or through the OSS.

Another group of cell parameters may be seen as effecting the instructions sent to active MSs. Such parameters could affect the cells with which the active MS interacts, during the communication session or the handover between overlapping cells. An example of such cell parameters is the IndividualOffset in UMTS networks. The IndividualOffset influences the attractiveness of certain neighboring cells, and therefore may influence the cell to which the MS would handover to during an active session.

In other words, certain cell configuration parameters enable the cell rating for active mobile stations performed by the cellular telecommunication network. Further, a change of said parameters may affect the cell rating performed by active mobile stations. A change of at least one cell configuration parameter of a cell that affects the cell rating for active mobile stations may be performed through the RNC or through the OSS.

There are also parameters that are responsible for the availability of the MSs to the network. Such a parameter is the periodic "keep alive" interval that requires all idle MSs to transmit to the network a 'keep alive' update, in case the MS is in the idle state for a duration exceeding the predefined keep alive interval as broadcast in the system information in the cells' control channel.

In other words, the cells of the telecommunication network are defined in the network by cell configuration parameters. A first group of cell configuration parameters are broadcast by the cells in their respective control channel and enable the cell rating for idle mobile stations receiving said control channels. Therefore, a change in the first group of parameters may affect the cell rating for idle mobile stations. The cell rating for idle mobile stations determines on which cell the idle mobile stations camp, and thus through which cell telecommunication services are communicated (initiated). A second group of cell configuration parameters enables the cell rating for active mobile stations. Therefore, a change in the second group of parameters may affect the cell rating for active mobile stations. The cell rating for active mobile stations determines through which cell the telecommunication services are communicated (continued on the same cell or handed-over to another cell).

Cell Performance Monitoring and Traffic Events (TE)

Cellular telecommunication networks are also equipped with cell performance monitoring systems usually a part of the RNC or Operations and Support System (OSS) 230. Each cell performance indicator is periodically and continuously collected into a database. Such a performance database enables the operator to monitor the operation of the network and detect the network performance and various faults.

A Traffic Event is any active, bi-directional communication between a MS and the network (thru a cell), which was either initiated by the MS or by the network. For example, without intention of being limited, a Traffic Event could be: radio initiated channels, calls initiated and received, channel handed over to/from cell, periodic/normal location updates and the like. Each Traffic Event includes a cell identifier (Cell-ID) that enables the CN and RAN to identify from which cell the traffic was initiated. The TE could be monitored and obtained from two main sources:

i. Operations Support System (OSS) 230 which collects Key Performance Indicators (KPI) of the network activity per cell. The KPI usually is a counter which counts the number of times a specific Traffic Event occurred. For example, without intention of being limited, in UMTS; RRC Establish, RRC Failure, channel handover and periodic/normal Location Updates and the like.

ii. Probing and monitoring various traffic interfaces such as, without being limited, to the A/Iu interfaces in GSM/UMTS networks. These traffic interfaces contain the entire data of the traffic including MS identity, RAN identities and other switching information and the like. Each Traffic Event could be correlated to a MS identity (detailed statistics) or in a form of aggregated data (as described in i), which normally does not contain MS identity for each Traffic Event.

Correlation Between MS/TEs and CC-Type

Since most of the time MSs are in the idle state, and therefore do not communicate with the network, the network does not have continuous communication with the MSs. Therefore, the only way to obtain information about MSs is during a traffic session, which is known as TE. Therefore, each MS is represented by one or more TEs.

By applying a specific cell configuration (the "Intervention Configuration") for cell(s) in a SA, which influences the way idle and active MS camp and communicates on/thru the cells in the SA, a specific distribution of MS between the cells in the SA is applied (correlated to the specific Intervention Configuration). More specifically, configuring the Intervention Configuration that controls the MS Cell-Reselection procedure, (for the selection of the best cell during idle and active state) is creating a criterion that steers idle and active MS to designated cells in the SA (with respect to the Intervention Configuration criterion).

As explained above, MSs constantly camp on the best cell available (with regard to the Cell-Reselection procedure) and any service initiation will be performed through the best cell. By monitoring TEs, it is possible to obtain the cell thru which each TE was initiated and therefore the best cell of the MS that originated that TE.

Correlating the obtained best cell of MS s/TEs in the SA with the selected Intervention Configuration in the SA, indicates the CC-Type as classified by each MS (represented by its TE). Classifying MSs/TEs in the SA to a specific type of CC-Type, requires a specific Intervention Configuration in the SA, as will be explained in FIGS. 3-8.

For example, when applying an Intervention Configuration that will steer all MSs out of a certain cell to neighboring cells in the SA, when possible, and monitoring all TEs initiated through that cell, indicates that all MSs that initiated services through that cell, did not have any other cell to camp on in the SA, and therefore are of type CC-Type-1 with respect to that cell.

Each MS in the SA can generate more than one TE per a given period. Therefore, in cases where each TE includes the MS identity, this could be taken into account. For example, consider all TEs from a certain MS that were initiated through a specific cell, as one TE. In this case there is a one-to-one correlation between a MS and a TE (each MS represented by one TE per given period).

In other words, the traffic events may be associated to mobile station identities so that it is possible to determine the ratio of traffic communicated using the selected cells and associated to different mobile station identities.

On the other hand, when the TEs do not include the MS identity, the exact amount of MSs in the SA may not be discovered. Therefore, there is no one-to-one correlation between MSs and TEs, but it is possible to utilize a known statistical ratio between them.

The Radio Coverage Analyzer (RCA) System

A system for obtaining information relating to the radio coverage contribution of a cell to a Service Area in a cellular telecommunication network is provided. The system includes a computing platform which is in communication with a Radio Network Controller (RNC) and monitors a traffic interface of the cellular network. The computing platform is configured for (i) changing various cell configurations of network cells for a specified duration; and (ii) monitoring various traffic and service parameters of a cell and its neighboring cells and (iii) correlating the said monitored traffic and said cell configuration to obtain information relating to the cells' radio coverage contribution.

FIG. 2 also includes the Radio Coverage Analyzer (RCA) 240 system in accordance with the preferred embodiment of the present invention, and the connection of the RCA 240 to the network 200.

The RCA 240 includes three main modules as follows:

i. Network Performance Monitor (NPM) 242. The NPM 242 is connected to the network's Operations Support System (OSS) 230 which constantly monitors the network traffic and/or is connected to various traffic interfaces such as, without being limited, to the A/Iu interfaces in GSM/UMTS networks. Each TE may be correlated to a MS identity (detailed statistics) or in the form of aggregated data, which normally does not contain MS identity for each Traffic Event.

ii. Cell Configuration Manager (CCM) 243. The CCM 243 is connected to the network's Operations Support System (OSS) 230 and thru the OSS 230 can change various cell configuration parameters in real-time. Such parameters are, and without intention of being limited; radio transmission power, cell reselection parameters such as the Qoffset and Sintersearch and the Periodic Location Update Timer (T3213), for UMTS network.

iii. Intervention Analysis Engine (IAE) 241 which is responsible for launching radio coverage analysis on selected cells. The IAE 241 receives a radio coverage analysis request for a selected cell by the RCA 240 system. The IAE 241 will send a Cell Configuration Command (CCC) 245 to the CCM 243 which will implement the CCC in the network. The IAE 242 will also send a cell Traffic Event Monitoring Command (TEMC) to the NPM 242 to monitor all relevant TEs for a specified duration and optionally to send back to the IAE 241 past traffic events that were recorded prior to system operation.

Figure 3:
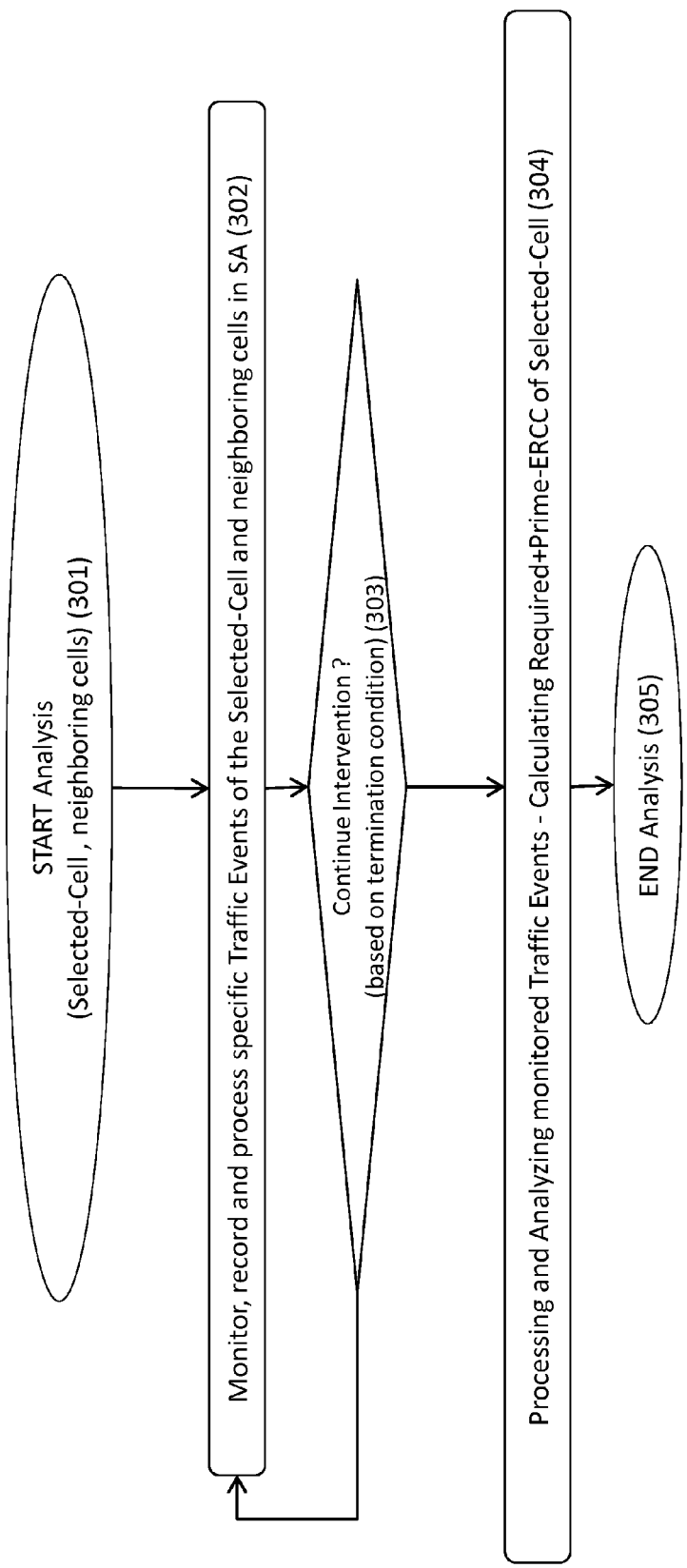
FIG. 3: shows a flow chart illustrating the operation of a RCA system for obtaining the Required-ERCC+Prime-ERCC of a selected cell in accordance with an embodiment of the present invention.

FIG. 3 shows a flow chart illustrating the operation of RCA system when obtaining the Required-ERCC+Prime-ERCC of a selected cell. In a state where an Intervention Configuration is not applied to cells in the SA, there exists a normal distribution of MSs between the cells in the SA. This normal distribution is represented as the Required+Prime ERCC.

Step 301: Select a Selected-Cell and the neighboring cells that together constitute a Service Area (SA).

Step 302: The NPM 242 monitors, process and record various TEs originating from the Selected-Cell and all other cells in the SA. The aim of the monitored TEs is to detect the MS distribution, which is represented by the TE distribution between the cells in the SA. The NPM 242 monitors various TEs as explained in FIG. 2 under the "Cell Performance Monitoring and Traffic Events (TE)" section.

Step 303: Based on a predefined Analysis Termination Condition, the system will evaluate whether to remain in the analysis period and go back to step 302, or to end the analysis period and continue to step 304. The Analysis Termination Condition could be, time duration, results from step 302 or any other predefined condition.

Step 304: The RCA 240 collects the total amount of all TEs in the SA, and the amount of TEs originated from each cell in the SA. The RCA calculates the Required+Prime ERCC of the Selected-Cell to the SA by the following formula:

$$\text{Amount\_Required+Prime} - ERCC_{Selected-Cell\_to\_SA} = \text{Amount of Traffic Events}_{Selected-Cell}$$

$$\text{Required+Prime} - ERCC_{Selected-Cell\_to\_SA} = \frac{\text{Amount of Traffic Events}_{Selected-Cell}}{\text{Amount of Traffic Events}_{SA}}$$

It should understood, that for the ratio calculation to be accurate, the amounts of TEs should be sufficient. The RCA 240 can optionally make use of traffic monitored prior or after the analysis to compare results.

In other words, monitoring a distribution of the traffic events within the cells of the service area enables to estimate a distribution of the mobile stations between the selected cell(s) and the other cells of the service area. Therefore, a contribution of the selected cell(s) to the delivery of telecommunication services to the mobile stations in the service area can be inferred. In fact, since no change in the parameters affecting the rating has been performed, the mobile stations communicating with the selected cell(s) are the mobile stations that are only covered by the selected cell(s) (mobile stations occupying CC#1 type CC) and the mobile stations that rate the selected cell as the best cell for camping and/or communicating (mobile stations occupying a CC#2 type CC). According to the previous description, this corresponds to the sum of the Required-ERCC and the Prime-ERCC of the selected cell(s). The Required+Prime ERCC of the selected cell(s) may be indicative of a probability that a mobile station in a given service area be dependent on the radio coverage of the selected cell(s) or that the selected cell(s) be the best rated cell for the mobile station.

Figure 4:
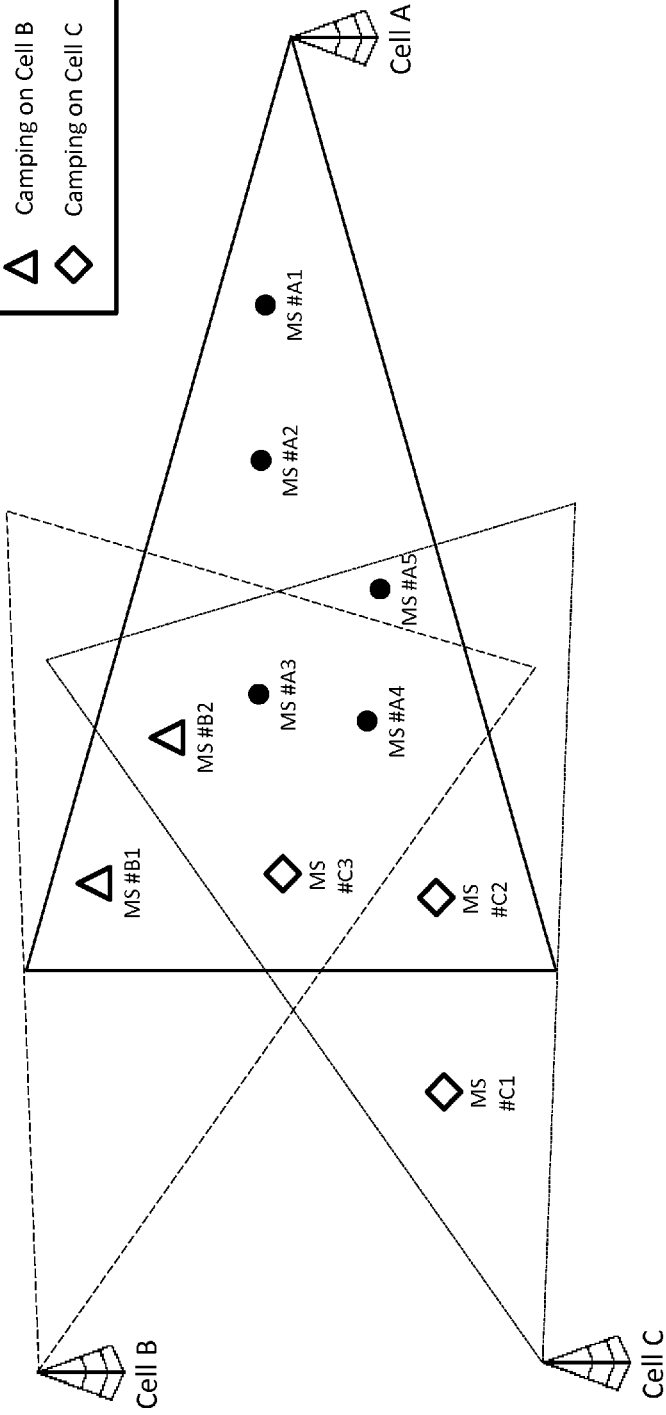
FIG. 4A: shows a pictorial representation of ten MSs present in the selected SA prior to the RCA system intervention for obtaining the Required+Prime ERCC of a selected cell in accordance with an embodiment of the present invention.
FIG. 4B: shows a table with the distribution of TE for a specified Intervention Period, prior to the RCA system intervention, of the state described in FIG. 4A.

FIGS. 4, 6 and 8 demonstrate a scenario in which ten (10) MSs are present in a selected SA which is comprised of the radio coverage of three cells, Cell-A, Cell-B and Cell-C. Each MS camped on one best cell perceived, based on radio condition and cell reselection criteria. The figures illustrates the situation prior to the operation of the RCA 240 system and during the Intervention Period during the operation of the RCA 240 system.

FIG. 4A shows a pictorial representation of ten MSs present in the selected SA prior to the RCA system 240 intervention for obtaining the Required+Prime ERCC of a selected cell.

As illustrated, the SA is comprised of the radio coverage of three cells (A,B,C). The Area of Coverage (AoC) of each cell is illustrated by a triangle. The Areas of Coverage (AoC) of the three cells overlap at certain areas.

In the figure are ten (10) MSs. Each MS camped on only one of the three cells (A,B,C). For reasons of simplification, it is determined that the ten (10) MSs do not move in the SA and that the radio reception of their camping cell and neighboring cell is not changing. Each MS is represented by a circle, triangle or diamond; the shape by which the MS is represented indicates the cell on which it camps, as illustrated in the legend. Each MS has an ID number starting with the letters indicating the initial camping cell (A,B,C) prior to system intervention, and a number from 1 to 5. For example MS #A2, is a MS that is camping on cell A in the state prior to the RCA 240 system intervention and has the ID of 2.

As illustrated in the figure MS #A1 and MS #A2 are camping on Cell-A and are not present in the overlapping area with Cell-B and Cell-C. Therefore, MS #A1 and MS #A2 can receive service only from Cell-A.

MS #A3 and MS #A4 are camping on Cell-A and are present in the overlapping area of Cell-A, Cell-B and Cell-C and therefore will be able to receive service from, and camp on, any of these cells if needed.

MS #A5 is camping on Cell-A and is in the overlapping area of Cell-A and Cell-C but not Cell-B.

Similarly, MS #B1 and MS #B2 are camping on Cell-B whereas MS #B1 is in the overlapping area with Cell-A and MS #B2 is in the overlapping area of Cell-A and Cell-C.

MS #C1, #C2 and #C3 are camping on Cell-C whereas, MS #C1 is not in the overlapping area of any cell, MS #C2 is in the overlapping area with Cell-A and MS #C3 is in the overlapping area with Cell-A and Cell-B.

FIG. 4B shows a table with the distribution of TEs for a specified sampling duration prior to the RCA system intervention, of the state described in FIG. 4A. As seen in the table of FIG. 4B there are a total of ten (10) TEs in the SA for the Intervention Period.

For purpose of simplifying the illustration, it is determined that each MS from FIG. 4A has transmitted one Traffic Event during the analysis period, although in reality each MS can transmit more than one TE, depending on the duration of sampling and the MS traffic demand.

The table shows the distribution of TEs between the cells in the SA. This distribution of TEs equals the distribution of MSs in the SA (since it is assumed that there is a one-to-one correlation between each TE and a MS). The total amount of TEs during the analysis is ten (10). The RCA 240 now can calculate the Required+Prime-ERCC of Cell-A to the SA (which consists of Cells A,B,C) by using the Required+Prime-ERCC formulas as presented in FIG. 3:

$$\text{Amount\_Required+Prime} - ERCC_{Cell\text{-}A\_to\_SA} =$$

$$\text{Amount of Traffic Events}_{Cell\text{-}A} = 5$$

$$\text{Required+Prime} - ERCC_{Cell\text{-}A\_to\_SA} =$$

$$\frac{\text{Amount of Traffic Events}_{Cell\text{-}A}}{\text{Amount of Traffic Events}_{SA}} = \frac{5}{10} = 50\%$$

The meaning of Required+Prime-ERCC of 50% is that 50% of the MSs in the SA found Cell-A to be the best cell available in the SA during their idle state and therefore the services initiating from these MSs were initiated from Cell-A. Therefore, each of these MSs classifies Cell-A as CC-Type-1 or CC-Type-2, and it is not possible to distinguish between the types, since the RCA system 240 did not perform any intervention.

In this analysis, the Required+Prime ERCC of both Cell-B and Cell-C could optionally be calculated since the TEs for these cells are also known; this is due to the fact that the Required+Prime Analysis does not require a system intervention, i.e. no reconfiguration of the cells in the SA. The state of the traffic distribution is as the normal traffic distribution.

Figure 5:
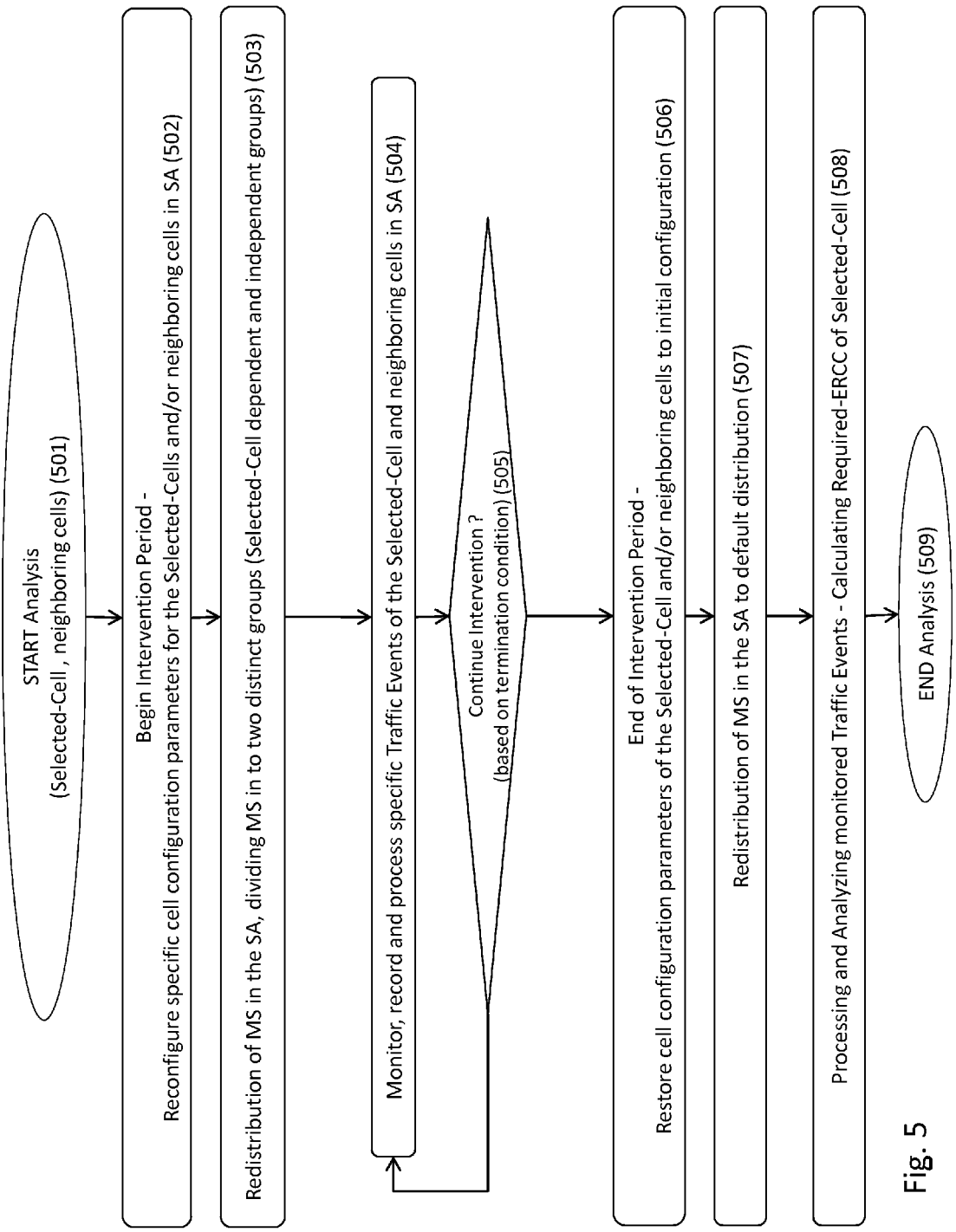
FIG. 5: shows a flow chart illustrating the operation of RCA system for obtaining the Required-ERCC of a selected cell in accordance with an embodiment of the present invention.

FIG. 5 shows a flow chart illustrating the operation of RCA system for obtaining the Required-ERCC of a selected cell;

Step 501: Select a Selected-Cell and the neighboring cells that together constitute a Service Area SA.

Step 502: Beginning of Intervention Period; during this period the RCA system 240 performs various cell configurations (Intervention Configuration) for cell in the SA. This change affects the way MSs in the SA rate and camp on cells in the SA, and therefore affects the communication patterns of MSs in the SA. This will enable the RCA system 240 to obtain the Required-ERCC. The RCA 240 system issues the IAE 241 a radio coverage analysis of type Required-ERCC for the Selected-Cell with given SA cells.

The IAE 241 through the CCM 243 performs a reconfiguration of specific cell configuration parameters (an Intervention Configuration) for the Selected-Cell and/or some of its neighboring cells in the SA. The aim of the reconfiguration is to make the Selected-Cell to be the least rated cell for all MSs in the SA, whether the MSs are in the idle or active state. This reconfiguration affects the Cell-Reselection procedure for all MSs in the SA by lowering the rating of the Selected-Cell to the minimal value possible in the Cell-Reselection process.

Lowering the rating of the Selected-Cell creates a scenario in the SA where the Selected-Cell is "virtually inaccessible" for MSs that can receive service from more than one cell (CC-Type-2 with respect to the Selected-Cell), and enables the RCA system 240 to obtain the Required-ERCC of the Selected-Cell in the SA. The reconfiguration (the Intervention Configuration) can change various cell configuration parameters, but not limiting to, UMTS Qrxlevmin, Qqualmin, Qoffset, Individualoffset or any other thresholds that can affect idle or active state MSs and whether they can camp/communicate on the Selected-Cell.

Step 503: Since the reconfiguration of step 502 is received by MSs in the SA in near real-time, each MSs will react to the new configuration differently with respect to the reception from cells and the Intervention Configuration. Therefore, there will be a redistribution of MSs between cells in the SA as a direct result of step 502. MSs that were camped and communicated on\thru the Selected-Cell will be divided into two distinct groups:

i. Selected-Cell independent—MSs in this group are currently camping on the Selected-Cell, which is the best cell for them. Additionally these MSs have radio reception from at least one or more cells in the SA. Due to the reconfiguration of step 502, the Selected-Cell will now be rated by all MS in the SA as low/lowest cell in the SA and therefore all MSs will reselect to camp on one of the other cells in the SA. These MSs will now camp and communicate on/through the neighboring cells. Since these MSs are camping on the neighboring cells, all services that are originating or terminating to the MSs will be first initiated through that neighboring cell instead of the Selected-Cell. Prior to the reconfiguration these MSs would initiate services thru the Selected-Cell. In accordance to what was explained in FIG. 1, since MSs could represent a CC, MSs in this group could be considered as of CC-Type-2 with respect to Cell-A.

ii. Selected-Cell dependent—MSs in this group are currently camping on the Selected-Cell, which is the best cell for them. But these MSs don't have radio reception from any other cells in the SA and therefore this is the best and only cell for them. Even though the reconfiguration of step 502, lowered the rating of the Selected-Cell, these MSs will still camp on the Selected-Cell, since they do not have any other alternative. Therefore, they will remain camping and communicating on/through the selected cell. For these MSs nothing is changed and services that are originating or terminating for these MSs will be initiated through the Selected-Cell. In accordance with what was explained in FIG. 1, since MSs could represent a CC, and MSs in this group could be considered as of CC-Type-1 with respect to Cell-A.

Step 504: The NPM 242 monitors, processes and records various TEs originating from the Selected-Cell and all other cells in the SA. The aim of the monitored TEs is to detect the MSs distribution, which is represented by the TE distribution between the cells in the SA. The NPM 242 monitors various TEs as explained in FIG. 2 under the "Cell Performance Monitoring and Traffic Events (TE)" section.

Step 505: Based on a predefined Intervention Termination Condition, the system will evaluate whether to remain in the Intervention Period and go back to step 504 or to end the Intervention Period and continue to step 506. The Intervention Termination Condition may be time duration, and results from step 504 or any other predefined condition.

Step 506: The Intervention Period is over. The IAE 241 will send the CCM 243 a command to restore the configuration of the Selected-Cell and neighboring cells to their default, prior to Intervention Configuration.

Step 507: Optionally, MSs in the SA will redistribute back to the default MSs redistribution between cells in the SA. Since the Intervention Configuration changed cell parameters that cause the Selected-Cell to be the least rated for all MSs in the SA, upon configuration restore, the rating of the Selected-Cell will be the same as before the intervention.

Step 508: The RCA 240 collects the total amount of all TEs in the SA, and the amount of TEs initiated from each cell in the SA. The RCA calculates the Required-ERCC of the Selected-Cell to the SA by the following formula:

$$\text{Amount\_Required-}ERCC_{Selected\text{-}Cell\_to\_SA} =$$

$$\text{Required}-ERCC_{Selected\text{-}Cell\_to\_SA} = \frac{\text{Amount of Traffic Events}_{Selected\text{-}Cell}}{\text{Amount of Traffic Events}_{SA}}$$

It should understood, that for the ratio calculation to be accurate, the amounts of TEs should be sufficiently high (in terms of intervention duration and TEs amounts). The RCA 240 can optionally make use of traffic monitored prior or after the intervention to compare results.

In other words, modifying the configuration of the cells in the service area so as to make the selected cell(s) the least rated cells causes mobile stations that are covered by another cell of the service area other than the selected cell(s) to communicate with said other cell. Therefore, the mobile stations communicating with the selected cell(s) during the intervention period are the mobile stations that are only covered by the selected cell(s) (mobile stations occupying CC#1 type CC). Thus, it is possible to determine the Required-ERCC for the selected cell(s). The Required-ERCC of the selected cell(s) in a given service area may be indicative of a probability that a mobile station in the service area be dependent on the radio coverage of the selected cell(s) i.e. only covered by said selected cell(s).

Figures 6A, 6B:
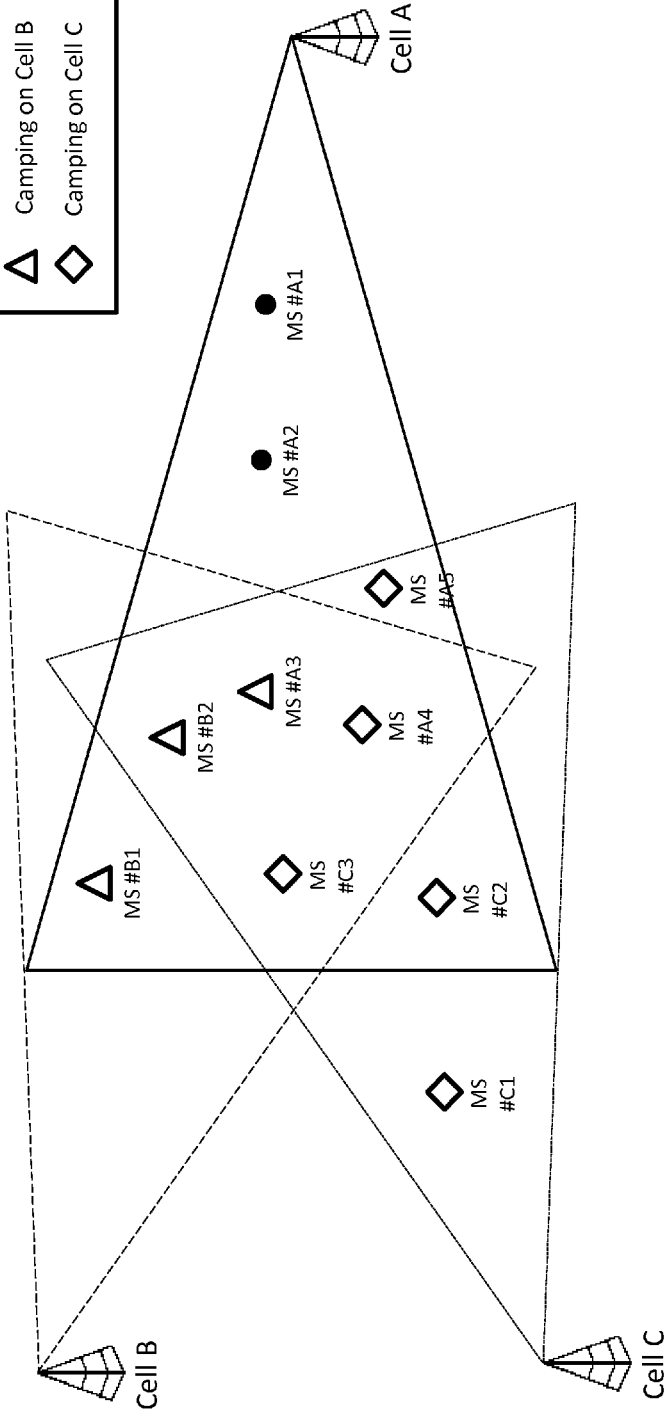
FIG. 6A: shows a pictorial representation of ten MSs present in the selected SA during the RCA system intervention for obtaining the Required-ERCC of a selected cell in accordance with an embodiment of the present invention.
FIG. 6B: shows a table with the distribution of TE between the cells in the SA, for a specified Intervention Period and the results of system calculation after the RCA system intervention, in accordance with FIG. 6A.

FIG. 6A shows a pictorial representation of ten MSs present in the selected SA during the RCA system intervention for obtaining the Required-ERCC of a selected cell. For the purpose of this example, FIG. 4 is considered as illustrating the normal and default state of MSs distribution in the SA. This is the state prior to the system intervention. The state illustrated in FIG. 6A, represents the state after the Intervention Configuration (step 502) and the redistribution of MS in the SA (step 503) during the Intervention Period of the Required-ERCC analysis on Cell-A.

In this figure, Cell-A is the Selected-Cell and the neighboring cells have been defined to be Cell-B and Cell-C. As explained in Steps 502 and 503 of FIG. 5, at the beginning of the Intervention Period the system's CCM 243 reconfigures various cell parameters (Intervention Configuration) of Cell-A, Cell-B and Cell-C to make Cell-A the least rated cell in the SA. The reconfiguration causes all MSs that were camping on Cell-A prior to the intervention to try to camp on a neighboring cell if possible.

As seen in the figure, MS #A5 has moved to camp on Cell-C since it is in the area of overlapping between Cell-A and Cell-C. It should be noted that MS #A5 is now indicated by a diamond instead of the pervious indication of a circle, in accordance with the legend.

MS #A4 which previously camped on Cell-A is now camping on Cell-C since it is in the overlapping area of Cell-A, Cell-B and Cell-C and for MS #A4 the service provided by Cell-C is considered better than Cell-B's.

MS #A3 which previously camped on Cell-A is now camping on Cell-B since it is in the overlapping area of Cell-A, Cell-B and Cell-C and for MS #A3 the service provided by Cell-B is considered better than Cell-B's.

Since MS #A1 and MS #A2 are not in the overlapping area with any of the neighboring cells (Cell-B or Cell-C) they remained camping on Cell-A, unchanged.

It should be noted that since the aim of the system intervention was to lower the rating of Cell-A to MSs in the SA, MSs camped on Cell-B (MS #B1, #B2) and Cell-C (MS #C1, #C2, #C3) were not affected by the Intervention Configuration.

FIG. 6B shows a table with the distribution of TEs between the cells in the SA, for a specified Intervention Period and the results of system calculation after the RCA system 240 intervention, in accordance with FIG. 6A. The table is subject to the same simplification assumption used in FIG. 4B and now has the TEs during the Intervention Period which shows a distribution of TEs between the cells in the SA. This distribution of TEs equals to the distribution of MSs in the SA (since it is assumed that there is a one-to-one correlation between each TE and a MS).

The total amount of TEs during the analysis is ten (10). The RCA 240 now can calculate the Required-ERCC of Cell-A to the SA (which consists of Cells A,B,C) by using the Required-ERCC formulas presented in FIG. 5:

$$\text{Amount\_Required-}ERCC_{Cell\text{-}A\_to\_SA} =$$
$$\text{Amount of Traffic Events}_{Cell\text{-}A} = 2$$

$$\text{Required-}ERCC_{Cell\text{-}A\_to\_SA} =$$
$$\frac{\text{Amount of Traffic Events}_{Cell\text{-}A}}{\text{Amount of Traffic Events}_{SA}} = \frac{2}{10} = 20\%$$

The meaning of Required-ERCC of 20% is that 20% of the traffic in the SA, could not be carried out without the radio coverage from Cell-A. Therefore, 20% of the MSs in the SA are dependent on radio coverage of Cell-A and without it they would not be able to carry out any services.

Figure 7:
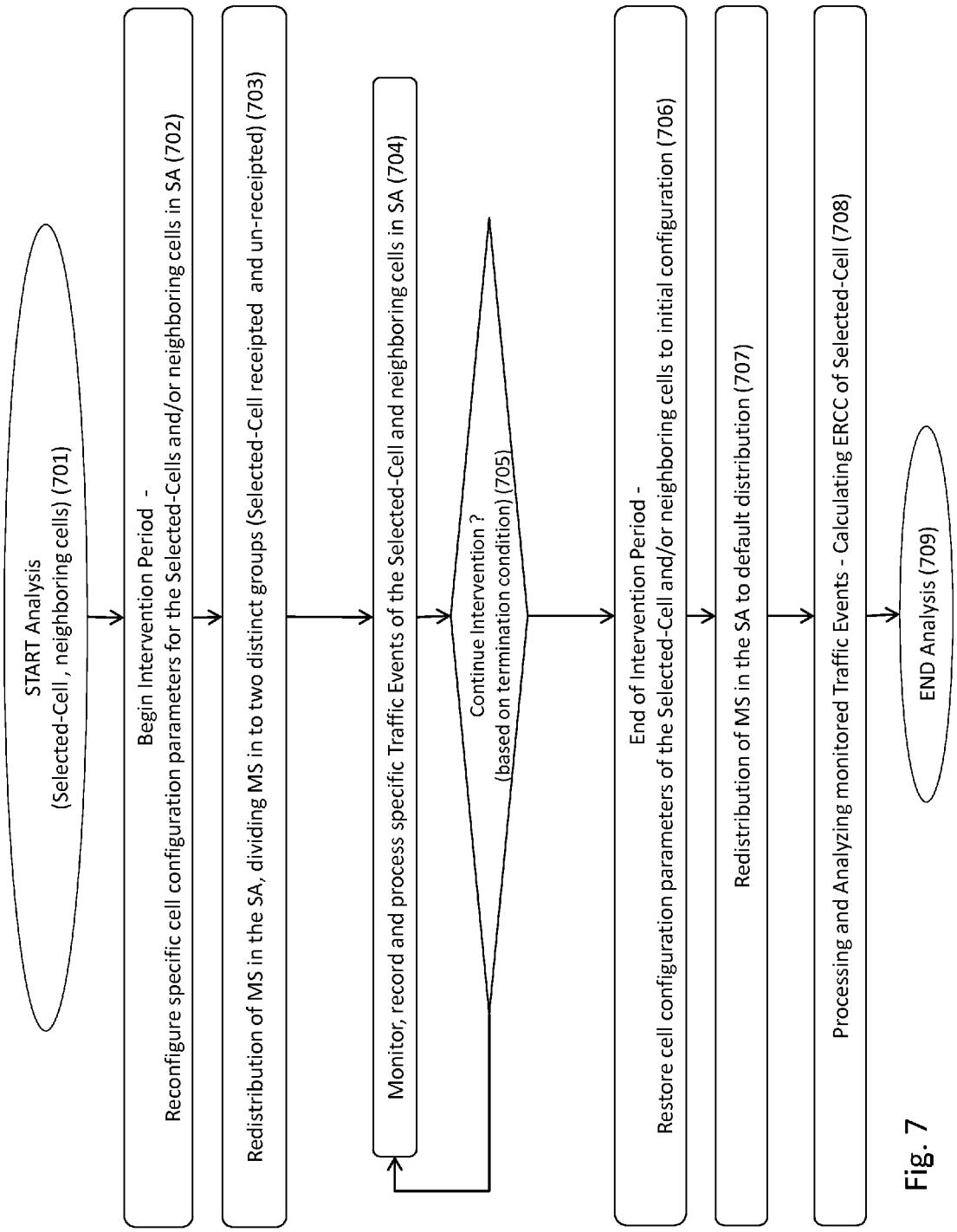
FIG. 7: shows a flow chart illustrating the operation of RCA system for obtaining the ERCC of a selected cell in accordance with an embodiment of the present invention.

FIG. 7 shows a flow chart illustrating the operation of RCA system 240 for obtaining the ERCC of a selected cell.

Step 701: Select a Selected-Cell and the neighboring cells that together constitute a Service Area SA.

Step 702: Beginning of Intervention Period; during this period the RCA system 240 performs various cell configurations (Intervention Configuration) for cells in the SA. This change affects the way MSs in the SA rate and camp on cells in the SA, and therefore, affects the communication patterns of MSs in the SA. This will enable the RCA system 240 to obtain the ERCC. The RCA 240 system issues the IAE 241 a radio coverage analysis of type ERCC for the Selected-Cell with given SA cells. The IAE 241 through the CCM 243 performs a reconfiguration of specific cell configuration parameters (an Intervention Configuration) for the Selected-Cell and/or some of its neighboring cells in the SA. The aim of the reconfiguration is to make the Selected-Cell to be the most rated cell for all MSs in the SA, whether the MSs are in the idle or active state.

This reconfiguration affects the Cell Reselection Process for all MS in the SA by increasing the rating of the Selected-Cell to the maximal value possible in the Cell Reselection procedure.

For the MSs that already camped on the Selected-Cell nothing is changed (they are of CC-Type-1 or CC-Type-2 with respect to the Selected-Cell). For the MSs not camping on the Selected-Cell (but can possibly receive service from the Selected-Cell), increasing the rating of the Selected-Cell causes a scenario in the SA where the neighboring cells are "virtually inaccessible" for these MSs (CC-Type-3 with respect to the Selected-Cell). Therefore, these MSs will move to camp on the Selected-Cell, and eventually will initiate services thru it. This enables the RCA system 240 to obtain the ERCC of the Selected-Cell in the SA.

The reconfiguration can change various cell configuration parameters, but not limited to UMTS Qrxlevmin, Qqualmin, Qoffset, Individualoffset or any other thresholds that can affect idle or active state MSs on whether they can camp/communicate on the Selected-Cell.

Step 703: Since the reconfiguration of step 702 is received by MSs in the SA in near real-time, each MSs will react to the new configuration differently with respect to the reception from cells and the Intervention Configuration. Therefore, there will be a redistribution of MSs between cells in the SA as a direct result of step 702. MSs that were camped and communicated on\through the Selected-Cell will be divided into two distinct groups:

i. Selected-Cell receipted—MSs in this group are currently camping on one of the cells in the SA, but do not camp on the Selected-Cell. These MSs also have the radio reception from the Selected-Cell but it is not rated as the best cell in the SA. These MSs would normally camp and communicate on/through one of the neighboring cells of the Selected-Cell but due to the reconfiguration of step 702, the Selected-Cell will now be rated by all MS in the SA as high/highest cell in the SA and therefore all MSs in this group will reselect to camp on the Selected-Cell. Since these MSs are now camping on the Selected-Cell, all services that are originating or terminating to these MSs will be first initiated through that Selected-Cell instead of their initial neighboring cell. In accordance with what was explained in FIG. 1, since MS could represent a CC, MS in this group could be considered of CC-Type 3 with respect to the Selected-Cell.

ii. Selected-Cell un-receipted—MSs in this group are currently camping on one of the cells in the SA, and do not camp on the Selected-Cell. Additionally, these MSs do not have any radio reception from the Selected-Cell. Although the reconfiguration of step 702 increased the rating of the Selected-Cell for all MSs in the SA, these MSs will remain to camp on their current cell since it is not possible for them to camp on the Selected-Cell, since these MSs do not have any signal reception from the Selected-Cell. For these MSs nothing is changed and services that are originating or terminating for these MSs will continue to be initiated thru their current cell in the SA. In accordance with what was explained in FIG. 1, since MSs could represent a CC, MS in this group could be considered of CC-Type-4 with respect to the Selected-Cell.

Step 704: The NPM 242 monitors, processes and records various TEs originating from the Selected-Cell and all other cells in the SA. The aim of the monitored TEs is to detect the MS distribution, which is represented by the TE distribution between the cells in the SA. The NPM 242 monitors various TEs as explained in FIG. 2 under the "Cell Performance Monitoring and Traffic Events (TE)" section.

Step 705: Based on a predefined Intervention Termination Condition, the system will evaluate whether to remain in the Intervention Period and go back to step 704 or to end the Intervention Period and continue to step 706. The Intervention Termination Condition may be time duration, results from step 704 or any other predefined condition.

Step 706: The Intervention Period is over. The IAE 241 will send the CCM 243 a command to restore the configuration of the Selected-Cell and neighboring cells to their default, prior to intervention, configuration.

Step 707: Optionally MSs in the SA will redistribute back to the default MS redistribution between cells in the SA. Since the Intervention changed cell parameters that cause the Selected-Cell to be the high/highest rated for all MSs in the SA, upon configuration restore, the rating of the Selected-Cell will be the same as before the intervention.

Step 708: The RCA 240 collects the total amount of all traffic event in the SA, and the amount of TE for each cell in the SA. The RCA calculates the ERCC of the Selected-Cell to the SA by the following formula:

$$\text{Amount\_ERCC}_{Selected-Cell\_to\_SA} = \text{Amount of Traffic Events}_{Selected-Cell}$$

$$ERCC_{Selected-Cell\_to\_SA} = \frac{\text{Amount of Traffic Events}_{Selected-Cell}}{\text{Amount of Traffic Events}_{SA}}$$

It should be understood, that for the ratio calculation to be accurate, the amounts of TEs should be sufficiently high (in terms of intervention duration and TEs amounts). The RCA 240 can optionally make use of traffic monitored prior or after the intervention to compare results.

In other words, modifying the configuration of the cells in the service area so as to make the selected cell(s) the most rated cells, causes all mobile stations that are covered by the selected cell(s) to communicate with the selected cell(s) even if they are also covered by other cells of the service area. Therefore, the mobile stations communicating with the selected cells during the intervention period are the mobile stations that are only covered by the selected cell(s) (mobile stations occupying CC#1 type CC), the mobile stations that are covered by the selected cell(s) and would, without intervention on the cell configuration, rate the selected cell(s) as the best cell for camping and/or communicating (mobile stations occupying a CC#2 type CC) and the mobile stations that are covered by the selected cell(s) and would not, without intervention on the cell configuration, communicate using the selected cell(s) (mobile station occupying a CC#3 type CC). Thus, it is possible to determine the ERCC of the selected cell(s) in the service area. The ERCC of the selected cell(s) in a given service area may be indicative of a probability that a mobile station in the service area be covered by the selected cell(s).

Figures 8A, 8B:
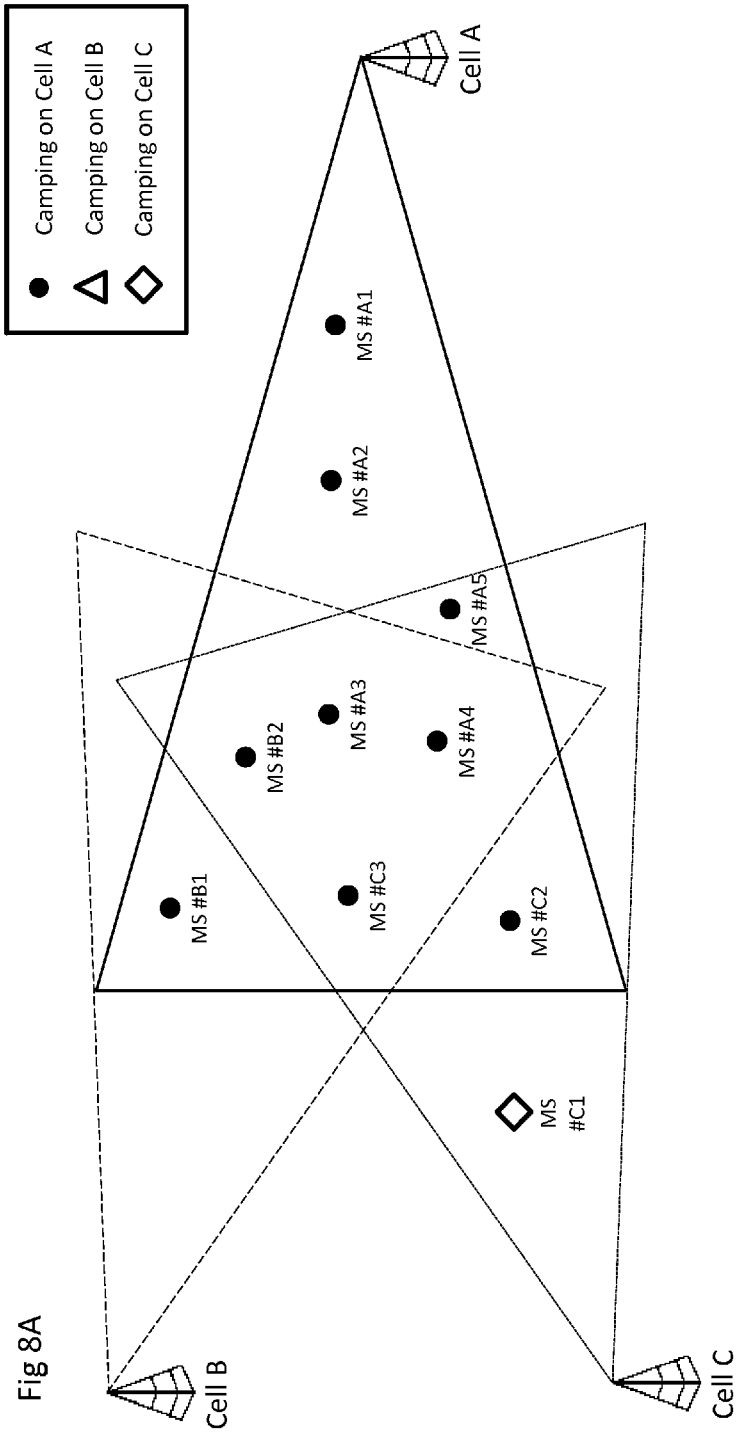
FIG. 8A: shows a pictorial representation of ten MSs present in the selected SA during the RCA system intervention for obtaining the ERCC of a selected cell in accordance with an embodiment of the present invention.
FIG. 8B: shows a table with the distribution of TE between the cells in the SA, for a specified Intervention Period and the results of system calculation after the RCA system intervention, in accordance with FIG. 8A.

FIG. 8A shows a pictorial representation of ten MSs present in the selected SA during the RCA system intervention for obtaining the ERCC of a selected cell. For the purpose of the example, FIG. 4 is considered as illustrating the normal and default state of the MS distribution in the SA. This is the state prior to the system intervention. The state illustrated in FIG. 8A, represents the state after the redistribution of MS in the SA (step 703) during the Intervention Period of the ERCC Analysis on Cell-A.

In this figure, Cell-A is the Selected-Cell and the neighboring cells have been defined to be Cell-B and Cell-C. As explained in Steps 702 and 703 of FIG. 7, at the beginning of the Intervention Period the system's CCM 243 reconfigures various cell parameters (Intervention Configuration) of Cell-A, Cell-B and Cell-C to make Cell-A the least rated cell in the SA. The reconfiguration causes all MSs that were camping on Cell-B and Cell-C prior to the Intervention to try to camp on Cell-A, if possible.

As seen in the figure, Since MS #B1 and #B2 are in the overlapping area of Cell-B and Cell-A, they have moved to camp on Cell-A instead of Cell-B on which they camped prior to the system's intervention. Similarly, MS #C2 and #C3 moved to camp on Cell-A from Cell-C.

On the other hand, MS #C1 is not in the overlapping area with Cell-A and therefore will remain to camp on Cell-C.

Since the system intervention aimed to make Cell-A the most attractive to MSs in the SA, MSs that previously camped on Cell-A remained camped on Cell-A. MS #A1, #A2, #A3, #A4 and #A5 were already camped on Cell-A prior to the RCA system 240 intervention and therefore will remain camped on Cell-A.

FIG. 8B shows a table with the distribution of TEs between the cells in the SA, for a specified Intervention Period and the results of system calculation after the RCA system intervention, in accordance with FIG. 8A. The table is subject to the same simplification assumption used in FIG. 4B and now has the TEs during the analysis which shows a distribution of TEs between the cells in the SA. The table shows the distribution of TEs between the cells in the SA. This distribution of TEs equals the distribution of MSs in the SA (since it is assumed that there is a one-to-one correlation between each TE and a MS).

The total amount of TEs during the analysis is ten (10). The RCA system 240 now can calculate the ERCC of Cell-A to the SA (which consists of Cells A,B,C) by using the ERCC formulas presented in FIG. 7:

$$\text{Amount\_ERCC}_{Cell-A\_to\_SA} = \text{Amount of Traffic Events}_{Cell-A} = 9$$

$$ERCC_{Cell-A\_to\_SA} = \frac{\text{Amount of Traffic Events}_{Cell-A}}{\text{Amount of Traffic Events}_{SA}} = \frac{9}{10} = 90\%$$

The meaning of ERCC of 90% (when assuming that there is a one-to-one correlation between each Traffic Event and a MS) is that 90% of the MSs in the SA have radio reception from Cell-A and it would be possible for each of these MS to camp on Cell-A during idle state or communicate through it during the active state.

During the ERCC analysis it is optional but possible to obtain the Required-ERCC of other cells in the SA, in a special end case. As shown in the table, Cell-B had zero TEs during the analysis, even though there are some MSs in the AoC of Cell-B as illustrated in FIG. 8A. This indicates that all MS in the SA that are also in the AoC of Cell-B preferred to camp on Cell-A. Therefore, in this special end case, the Required-ERCC of Cell-B could be determined as 0% with respect to the SA.

In other words, by making selected cell(s) the most rated cell(s) in the service area and by monitoring the traffic communicated using the other cells of the service area, it is possible to detect cells that can be switched off without causing substantial coverage hole in the service area. Indeed, if the amount of traffic communicated using one of the other cells is below a predetermined threshold, it can be considered that this cell can be switched of when the other cells of the service area are switched on or at least when the selected cell(s) are switched on.

FIG. 9A shows a flow chart illustrating the operation of RCA system when obtaining the Prime-ERCC of a selected cell;

Step 901: Select a Selected-Cell and the neighboring cells that together constitute a Service Area SA.

Step 902: Perform a Required+Prime ERCC Analysis, in accordance to the method described in FIGS. 3-4. This will provide for the Required+Prime ERCC of the Selected-Cell.

Step 903: Perform a Required ERCC Analysis, in accordance with the method described in FIGS. 5-6. This will provide for the Required-ERCC of the Selected-Cell.

Step 904: Calculating the Prime-ERCC of the Selected-Cell by the following formula:

$$\text{Prime-ERCC}_{Selected\text{-}Cell\_to\_SA} = (\text{Required+Prime-ERCC}_{Selected\text{-}Cell\_to\_SA}) - (\text{Required-ERCC}_{Selected\text{-}Cell\_to\_SA})$$

FIG. 9B shows a flow chart illustrating the operation of RCA system when obtaining the Supplement-ERCC of a selected cell.

Step 911: Select a Selected-Cell and the neighboring cells that together constitute a Service Area SA.

Step 912: Perform a Required+Prime ERCC Analysis, in accordance with the method described in FIGS. 3-4. This will provide for the Required+Prime ERCC of the Selected-Cell.

Step 913: Perform a ERCC Analysis, in accordance with the method described in FIGS. 7-8. This will provide for the ERCC of the Selected-Cell.

Step 914: Calculating the Supplement-ERCC of the Selected-Cell by the following formula:

$$\text{Supplement-ERCC}_{Selected\text{-}Cell\_to\_SA} = (\text{ERCC}_{Selected\text{-}Cell\_to\_SA}) - (\text{Required+Prime-ERCC}_{Selected\text{-}Cell\_to\_})$$

Reference is now made to the following examples (FIG. 10-11), which together with the above descriptions, illustrate the use of invention in a non-limiting fashion.

Figure 10A:
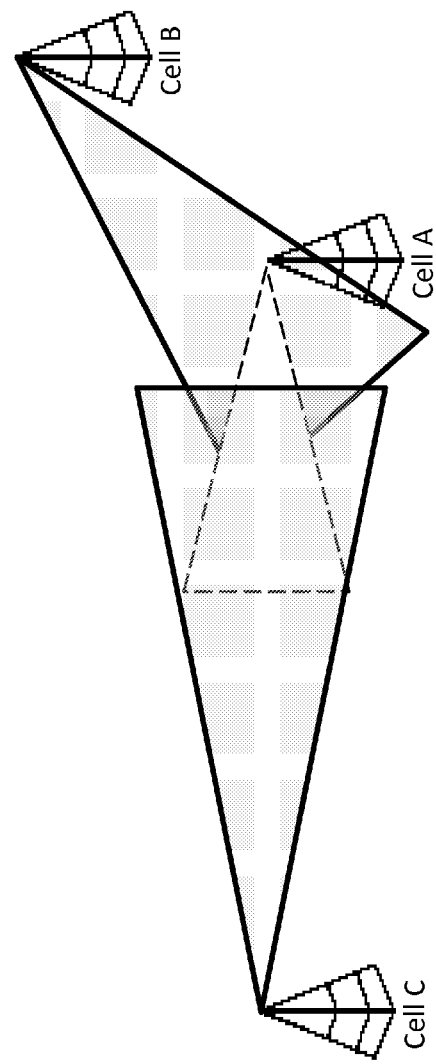
FIG. 10A: shows an application utilizing the ERCC and subgroups to reduce the energy consumption of the Radio Access Network (RAN) in accordance with an embodiment of the present invention.

FIG. 10A shows an application utilizing the ERCC and subgroups to reduce the energy consumption of the Radio Access Network (RAN). The aim of the RAN Energy Consumption Reduction (RECR) system is to reduce the overall energy consumption of the RAN which is the largest energy consumer in the network. The RAN is comprised of many RBS, each having a different energy consumption and traffic demands at different times of the day. The RECR system aims to switch-off RBSs or cells during off-peak hours or based on operator decision and to switch them back on when needed. Since switching-off a RBSs or cells could cause areas of coverage holes and therefore would cause MSs to enter to No-Service mode, switching-off a RBS or cell is a big challenge. The RECR system utilizes the information of the ERCC and subgroups of cells in the SA, to detect which cells/RBSs could be switched-off without causing a radio coverage hole in the SA.

The figure illustrates a SA with three cells (A,B,C). As shown in the figure the AoC of Cell-A is partly overlapped with Cell-B and Cell-C, each in a different area. Therefore, the AoCs of Cell-B and Cell-C together completely overlap with AoC of Cell-A. This means that if Cell-A were to be switched-off, there will not be any radio coverage holes in this SA. Applying a Required-ERCC Analysis to Cell-A (as described in FIGS. 5-6) would provide a result that the Required-ERCC of Cell-A is 0% with respect to the SA. Therefore, no MSs in the SA are dependent on the radio coverage provided by Cell-A, and it is safe to switch-off Cell-A during hours of low traffic demand or based on an operator's decision. It should be understood that although Cell-A is not required by the SA in terms of radio coverage, it could be required in terms of capacity.

Further, it is possible to define substantially overlapped cells for which a Required-ERCC is below a predetermined threshold (for example 1%). Substantially overlapped cells may also be switched off based on a predetermined condition such as low traffic demand. Switching off substantially overlapped cells does not substantially cause coverage holes in the cellular telecommunication network i.e. cause an acceptable rate of coverage holes.

Figure 10B:
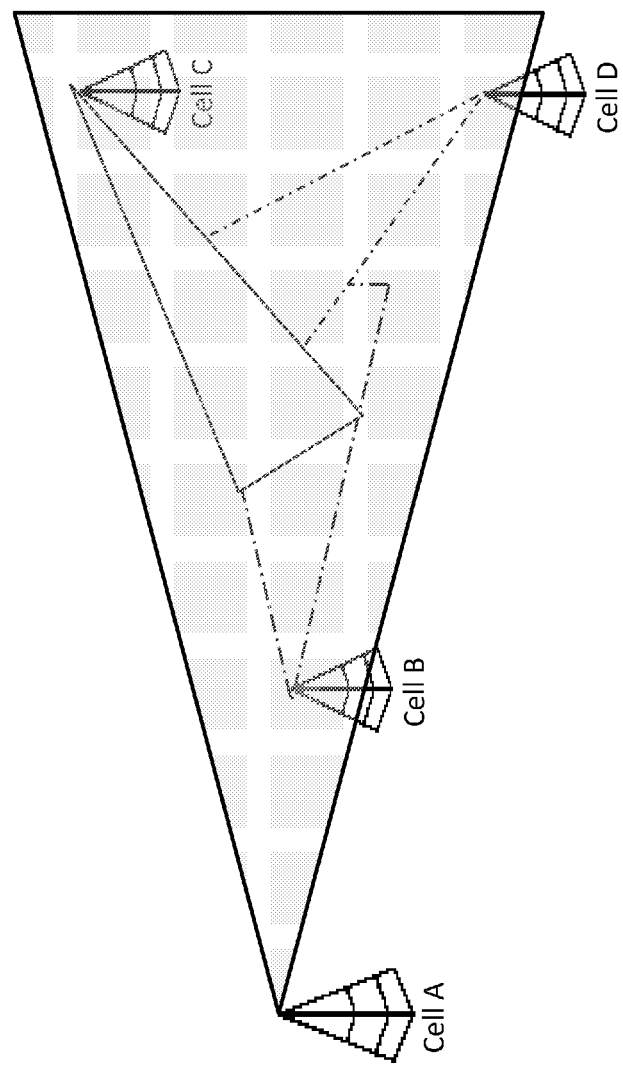
FIG. 10B: shows another application utilizing the ERCC and subgroups to reduce the energy consumption of the Radio Access Network (RAN) in accordance with an embodiment of the present invention.

FIG. 10B shows another application utilizing the ERCC and subgroups to reduce the energy consumption of the Radio Access Network (RAN). The figure illustrates another scenario where it is possible to switch-off cells in order to reduce the energy consumption of the network. The figure illustrates four Cells (A,B,C,D) and their AoCs. The AoC of Cell-A completely overlaps with the AoCs of Cells-B,C,D. This means that if Cells-B,C,D were to be switched-off, there will not be any radio coverage holes in this SA. Applying a ERCC Analysis to Cell-A (as described in FIGS. 7-8) would provide a result that the ERCC of Cell-A to the SA is 100% and therefore, the Required-ERCC of Cells A,B,C are 0%, as described in FIG. 8B. Therefore, no MSs in the SA are dependent on the radio coverage provided by Cells-B,C,D and it is safe to switch-off Cells-B,C,D during hours of low traffic demand or based on an operator's decision. It should be understood that although Cells-B,C,D are not required by the SA in terms of radio coverage, they could be required in terms of traffic capacity.

In other words, by checking if in a given SA the ERCC of one or more selected cell(s) is close to 100%, it is possible to determine that all the other cells of the SA which are not made the most rated are in fact redundant in terms of radio coverage, since almost all the traffic can be redirected to the selected cell(s). This enables to detect that all the other cells of the SA are in fact concurrently deactivable when the selected cell(s) are activated.

Figure 11A:
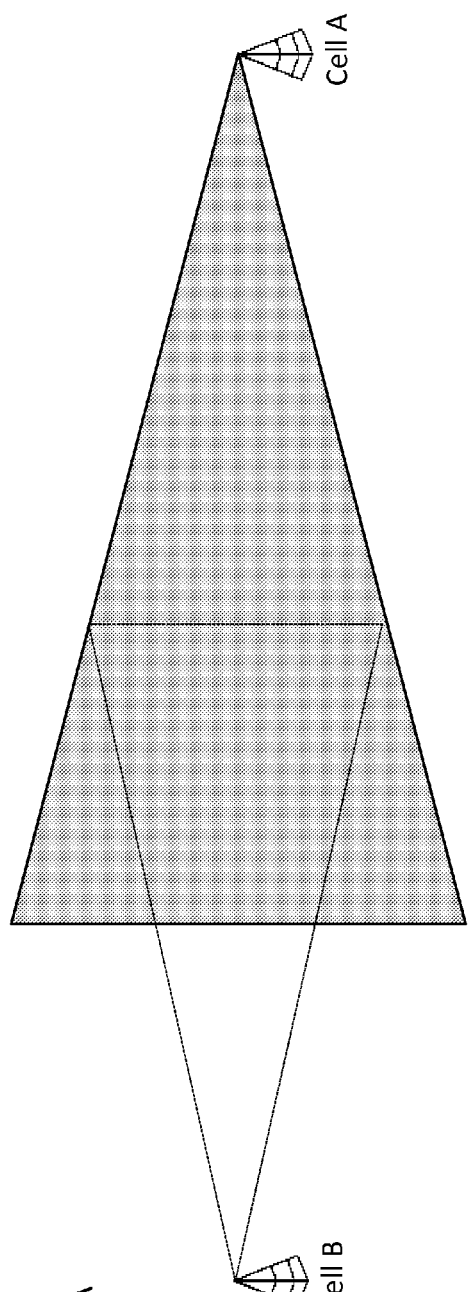
FIG. 11A-B: show an application utilizing the ERCC and subgroups to optimize the cell broadcast power and the cell antenna position in accordance with an embodiment of the present invention.

FIG. 11A shows an application utilizing the ERCC and subgroups to optimize the cell broadcast power and the cell antenna position. The aim of the Cell Broadcast Power Optimizer (CBPO) system and the Cell Antenna Position Optimizer (CAPO) system is to find the optimized configuration (in terms of broadcast power, and antenna position) for cells in the network. The cell broadcast power and position could have significant impact on the cell and SA performance. A cell not in the optimized configuration could cause for example, and without intention of being limited, unnecessary radio interference, decreased traffic capacity in the SA, reduce the quality of service and the like. Depending on the operator's decision in some cases, there will be a need to increase or decrease the cell broadcast power or to change the cell antenna position, such as its tilt. The CBPO and CAPO systems utilize the information of the ERCC and subgroups of cells in the SA, to analyze the degree of radio coverage overlapping between a Selected-Cell and a group of other neighboring cells (one or more cells).

The figure illustrates a SA with two cells, Cell-A and Cell-B. As shown in the figure, the AoCs of Cell-A and Cell-B are partly overlapped. By applying a ERCC Analysis and a Required-ERCC Analysis on Cell-A and subtracting the result of the Required-ERCC Analysis from the ERCC Analysis, provides the Supplement+Prime-ERCC of Cell-A with respect to the SA. The Supplement+Prime-ERCC result, represents the percentage of overlapping between Cell-A and Cell-B. Utilizing the Supplement+Prime-ERCC it is possible to explore cell broadcast power and/or cell antenna tilt in order to achieve a desired percentage of overlapping between Cell-A and Cell-B, by a process of "Trial & Error". This will be done by changing selected cell broadcast power and/or cell antenna tilt configurations and applying a Supplement+Prime-ERCC analysis to inspect if the target percentage of overlapping is achieved. For example in UMTS (3G) technology the radio modulation used is WCDMA, in such networks all cells broadcast on the same frequency, but each with a unique orthogonal Scrambling Code. Radio overlapping is needed to provide continuous communication across the networks but in such networks the area of overlapping between the cells causes interference since all cells use the same frequency. This interference decreases the cell traffic capacity and quality of service, so it is desired to find the best level of overlapping between cells in the network, such that would provide continuous radio coverage (and such that the level of overlapping be minimum to reduce interference between cells.

Figure 11B:
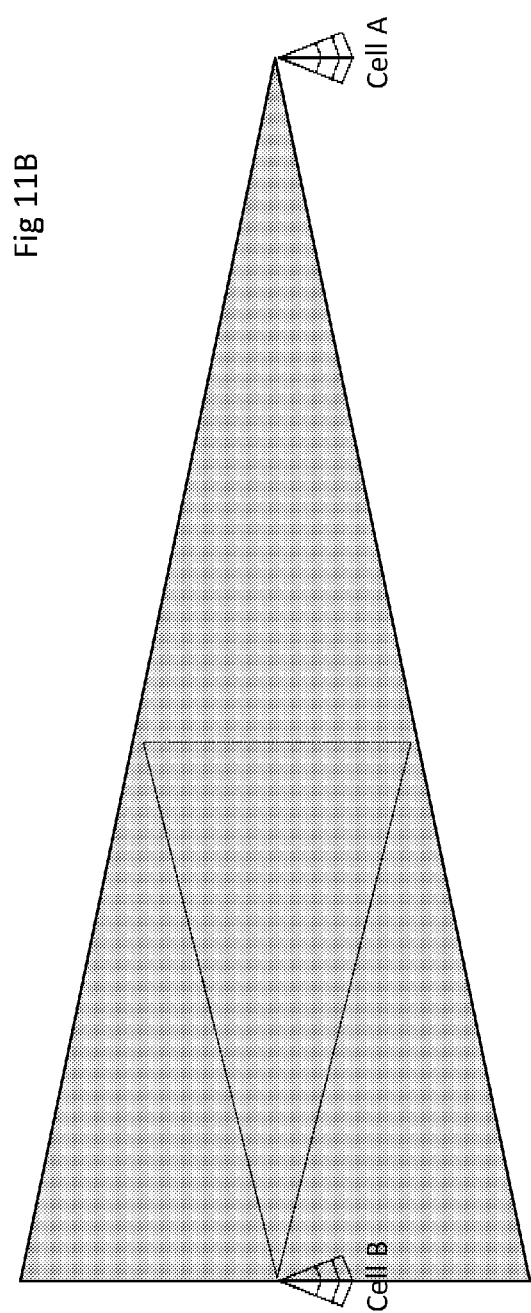

FIG. 11B shows an application utilizing the Supplement+Prime-ERCC to maximize the radio coverage overlapping between cells. For example in GSM (2G) networks the radio modulation used is TDMA, in which each cell has its own frequency so there is no interference between neighboring cells of different frequencies. In such networks it is sometimes preferable to maximize the radio overlapping between cells so as to increase the traffic capacity of the entire area. If the radio overlapping between two cells is maximized, then, if one of the cells gets overloaded, traffic could switch to the second cell which could be not loaded. If the radio coverage is not be maximized, then there might not be another cell to switch the traffic to. The process of maximizing the radio overlapping requires changing both broadcast power and antenna tilt and/or position. Additionally, it may check that the radio broadcast of the cell does not reach a cell of same frequency thus leading to interference. This could be the case if during the network design and deployment it was designed that the two cells would never interfere with each other because of their power and tilt configuration and distance. This figure illustrates a later state of FIG. 11A, where the cell broadcast power and/or cell antenna tilt configurations of Cell-A were changed with the purpose of achieving a complete overlap of the radio coverage of Cell-A to Cell-B. Applying Supplement+Prime-ERCC analysis on Cell-A would provide a result indicating that Cell-Bs' radio coverage is completely overlapped in the radio coverage from Cell-A.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method of analyzing a plurality of cells of a cellular telecommunication network, the plurality of cells providing telecommunication services to a service area and being set with one or more cell configuration parameters enabling a cell rating for mobile stations in the service area, the rate of the cell reflecting an attractiveness of said cell for the mobile stations, the method comprising:
selecting at least one cell among the plurality of cells;
changing at least one cell configuration parameter of at least one of the plurality of cells during an intervention period in order to affect a rate of the selected cell in the cell rating for the mobile stations in the service area,
monitoring traffic events communicated using the selected cell during the intervention period;
determining radio coverage contribution information of the selected cell based on an amount of traffic events communicated using the selected cell and a total amount of traffic events communicated using the plurality of cells during the intervention period,
monitoring traffic events communicated using the plurality of cells during the intervention period so as to determine the total amount of traffic events communicated using the plurality of cells during the intervention period, and
associating traffic events to mobile station identities and wherein said radio coverage contribution information is obtained by correlating the monitored traffic events associated with different mobile station identities and the change of parameters,
wherein the radio coverage contribution information is determined as a ratio between the amount of traffic events communicated using the selected cell associated with different mobile stations identities and the total amount of traffic events communicated using the plurality of cells of the service area associated with different mobile stations identities.

2. The method according to claim 1, wherein changing at least one cell configuration parameters comprises making the selected cell the least rated cell for the mobile stations in the service area.

3. The method according to claim 1, wherein changing at least one cell configuration parameters comprises making the selected cell the least rated cell for the mobile stations in the service area, and wherein the radio coverage contribution information comprises a required effective radio coverage contribution of said selected cell representing a ratio of the mobile stations in the service area that are dependent on the radio coverage of the selected cell.

4. The method according to claim 1, wherein changing the at least one cell configuration parameters comprises making the selected cell the most rated cell for mobile stations in the service area.

5. The method according to claim 1, wherein changing the at least one cell configuration parameters comprises making the selected cell the most rated cell for mobile stations in the service area, and wherein the radio coverage contribution information comprises an effective radio coverage contribution of said selected cell representing the ratio of the mobile stations in the service area that have radio reception from the selected cell.

6. The method according to claim 1, wherein the traffic events monitored comprise bi-directional communications between one of the mobile stations in the service area and one of the plurality of cells providing telecommunication services to the service area, said communication being either initiated by the mobile stations or by the plurality of cells.

7. The method according to claim 6, wherein the bi-directional communications comprise at least one of: radio initiated channels, calls initiated and received, channel handed over to a cell of the service area, channel handed over from a cell of the service area, periodic location update, normal location update and location update indicating return from no coverage area.

8. The method according to claim 1, wherein said radio coverage contribution information is obtained by correlating the monitored traffic events associated with different mobile station identities and the change of parameters.

9. The method according to claim 1, wherein changing at least one cell configuration parameter is performed on a cell configuration parameter that affects the cell rating for idle mobile stations.

10. The method according to claim 1, wherein changing at least one cell configuration parameters is performed on parameters that affect the cell rating for active mobile stations.

11. The method according to claim 1, wherein the cell rating for idle mobile stations in the service area is performed by said idle mobile stations based on control channels broadcasted by the plurality of cells and received by said idle mobile stations, and changing at least one cell configurations parameters comprises changing one or more parameters of the control channel broadcasted by said at least one of the plurality of cells so as to affect the rate of the selected cell in the cell rating performed by the idle mobile stations in the service area.

12. A method of analyzing a plurality of cells of a cellular telecommunication network, the plurality of cells providing telecommunication services to a service area and being set with one or more cell configuration parameters enabling a cell rating for mobile stations in the service area, the rate of a cell reflecting an attractiveness of said cell for the mobile stations, the method comprising:
   selecting a cell among the plurality of cells;
   changing at least one cell configuration parameter of at least one of the plurality of cells during a first intervention period in order to make the selected cell the least rated cell for the mobile stations in the service area;
   monitoring traffic events communicated using the selected cell during the first intervention period;
   monitoring traffic events communicated using the plurality of cells during the first intervention period so as to determine a total amount of traffic events communicated using the plurality of cells during the first intervention period;
   determining a required effective radio coverage contribution of said selected cell as a ratio between the amount of traffic events communicated using the selected cell and the total amount of traffic events communicated using the plurality of cells during the first intervention period;
   changing at least one cell configuration parameter of at least one of the plurality of cells during a second intervention period in order to make the selected cell the most rated cells for the mobile stations in the service area;
   monitoring traffic events communicated using the selected cell during the second intervention period;
   monitoring traffic events communicated using the plurality of cells during the second intervention period so as to determine a total amount of traffic events communicated using the plurality of cells during the second intervention period;
   determining an effective radio coverage contribution of said selected cell as a ratio between the amount of traffic events communicated using the selected cell and the total amount of traffic events communicated using the plurality of cells during the second intervention period; and
   estimating an overlap between the selected cell and the other cells of the plurality of cells based on the required effective radio coverage contribution and the effective radio coverage contribution of the selected cell.

13. The method according to claim 12, wherein estimating the overlap comprises calculating a difference between the effective coverage radio contribution and the required effective radio coverage contribution.

14. The method of determining a radio configuration of the selected cell among a plurality of cells of a cellular telecommunication network, the plurality of cells providing telecommunication services to a service area and being set with one or more cell configuration parameters enabling a cell rating for mobile stations in the service area, the method comprising:
   (a) setting a target overlap between the selected cell and the other cells of the plurality of cells;
   (b) configuring the selected cell with a given radio configuration;
   (c) estimating the overlap between the selected cell and the other cells of the plurality of cells according to the method of claim 12; and
   (d) iterating steps (b) and (c) as to determine a target radio configuration of the selected cell approaching the target overlap.

15. The method of creating a list of one or more target radio configurations of the selected cell among a plurality of cells of a cellular telecommunication network, the plurality of cells providing telecommunication services to a service area and being set with one or more cell configuration parameters enabling a cell rating for mobile stations in the service area, the method comprising:
   determining a list of one or more target overlaps between the selected cell and the plurality of cells; and
   determining the list of one or more target radio configurations of the selected cell respectively approaching the list of target overlaps according to the method of claim 14.

16. The method of configuring the selected cell among a plurality of cells of a cellular telecommunication network, the plurality of cells providing telecommunication services to a service area and being set with one or more cell configuration parameters enabling a cell rating for mobile stations in the service area, the method comprising:
   creating a list of target configurations of the selected cell respectively approaching target overlaps from a list of target overlaps according to the method of claim 15; and
   setting the radio configuration of the selected cell according to the radio configurations listed in the list of target radio configurations.

17. The method of configuring the selected cell among a plurality of cells of a telecommunication network, the plurality of cells providing telecommunication services to a service area and being set with one or more cell configuration parameters enabling a cell rating for mobile stations in the service area, the method comprising:
   (a) setting a target overlap between the selected cell and the other cells of the plurality of cells;
   (b) configuring the selected cell with a given radio configuration;
   (c) estimating the overlap between the selected cell and the other cells of the plurality of cells according to the method of claim 12; and (d) iterating steps (b) and (c) so as to configure the selected cell with a radio configuration approaching the target overlap.

18. The method of configuring the selected cell among a plurality of cells of a telecommunication network, the plurality of cells providing telecommunication services to a service area and being set with one or more cell configuration parameters enabling a cell rating for mobile stations in the service area, the method comprising:
   (a) setting a target radio configuration of the selected cell;
   (b) setting an overlap limit for an overlap between the selected cell and the other cells of the plurality of cells;
   (c) configuring the selected cell with a given radio configuration;
   (d) estimating the overlap between the selected cell and the other cells of the plurality of cells according to the method of claim 12; and
   (e) iterating steps (c) and (d) so as to configure the selected cell with a radio configuration approaching the target radio configuration while complying with the overlap limit.

19. The method according to claim 14, wherein the radio configuration of the selected cell comprises one or more parameters affecting the properties of the radio broadcast by the selected cells.

20. The method according to claim 14, wherein the radio configuration of the selected cell comprises broadcast power and antenna position.

21. A system for obtaining information on radio coverage contribution of a selected cell among a plurality of cells of a cellular telecommunication network, the plurality of cells providing telecommunication services to a service area and being set with one or more cell configuration parameters enabling a cell rating for mobile stations in the service area, the rate of a cell reflecting an attractiveness of said cell for the mobile stations, said system comprising:
   a cell configuration manager configured to change at least one cell configuration parameters of at least one of the plurality of cells during an intervention period in order to affect a rate of the selected cell in the cell rating for the mobile stations in the service area;
   a network performance monitor configured to monitor traffic events communicated using the selected cell during the intervention period and to monitor traffic events communicated using the plurality of cells during the intervention period, wherein the monitored traffic events are associated with mobile station identities; and
   a computing platform configured to determine the radio coverage contribution information based on an amount of traffic events communicated using the selected cell and a total amount of traffic events communicated using the plurality of cells during the intervention, wherein said radio coverage contribution information is obtained by correlating the monitored traffic events associated with the different mobile station identities and the change of parameters,
   wherein the computing platform is configured to determine the radio coverage contribution information as a ratio between the amount of traffic events communicated using the selected cell and the total amount of traffic events communicated using the plurality of cells of the service area.

22. The system according to claim 21, wherein the cell configuration manager is connectable to a radio network controller of the cellular telecommunication network and is configured to change the one or more cell configuration parameters through the radio network controller.

23. The system according to claim 21, wherein the network performance monitor is connectable to a cell performance monitoring system of the cellular telecommunication network, said cell performance monitoring system collecting performance indicators from the cells of the cellular telecommunication system and the network performance monitor is configured to monitor traffic events based on the performance indicators collected by the cell performance monitoring system.

24. The system according to claim 23, wherein the cell performance monitoring system is a part of a radio network controller or of an operation support system of the cellular telecommunication network.

25. The system according to claim 21, wherein the network performance monitor is configured to monitor traffic interfaces.

26. The system according to claim 21, wherein the cell configuration manager is configured to change the at least one cell configuration parameters of at least one of the plurality of cells so as to make the selected cell the least rated cells during the intervention period and wherein the radio coverage contribution information comprises a required effective radio coverage contribution of said selected cell representing the ratio of the mobile stations in the service area that are dependent on the radio coverage of the selected cell.

27. The system according to claim 21, wherein the cell configuration manager is configured to change at least one cell configuration parameters of the at least one of the plurality of cells so as to make the selected cell the most rated cells during the intervention period and wherein the radio coverage contribution information comprises an effective radio coverage contribution of said selected cell representing the ratio of the mobile stations in the service area that have radio reception from the selected cell.

28. The system according to claim 26, wherein the cell configuration manager is configured to change at least one cell configuration parameters of the at least one of the plurality of cells so as to make the selected cell the most rated cells during the intervention period and wherein the radio coverage contribution information comprises an effective radio coverage contribution of said selected cell representing the ratio of the mobile stations in the service area that have radio reception from the selected cell, and wherein the computing platform is configured to estimate an overlap between the selected cell and the other cells of the plurality of cells by calculating a difference between the effective radio coverage contribution and the required effective coverage contribution of the selected cell.

29. A cellular telecommunication network comprising the system according to claim 21.

30. A cellular telecommunication network comprising a plurality of cells, the plurality of cells providing telecommunication services to a service area and being set with one or more cell configuration parameters enabling a cell rating for mobile stations in the service area, the rate of a cell reflecting an attractiveness of said cell for the mobile stations, the cellular telecommunication network being configured to implement a method of analyzing a plurality of said cells, the method comprising:
   selecting at least one cell among the plurality of cells;
   changing at least one cell configuration parameter of at least one of the plurality of cells during a first intervention period in order to make the selected cell the least rated cell for the mobile stations in the service area;

monitoring traffic events communicated using the selected cell during the first intervention period;

monitoring traffic events communicated using the plurality of cells during the first intervention period so as to determine a total amount of traffic events communicated using the plurality of cells during the first intervention period;

determining a required effective radio coverage contribution of said selected cell as a ratio between the amount of traffic events communicated using the selected cell and the total amount of traffic events communicated using the plurality of cells during the first intervention period;

changing at least one cell configuration parameter of at least one of the plurality of cells during a second intervention period in order to make the selected cell the most rated cell for the mobile stations in the service area;

monitoring traffic events communicated using the selected cell during the second intervention period:

monitoring traffic events communicated using the plurality of cells during the second intervention period so as to determine a total amount of traffic events communicated using the plurality of cells during the second intervention period;

determining an effective radio coverage contribution of said selected cell as a ratio between the amount of traffic events communicated using the selected cell and the total amount of traffic events communicated using the plurality of cells during the second intervention period; and estimating an overlap between the selected cell and the other cells of the plurality of cells based on the required effective radio coverage contribution and the effective radio coverage contribution of the selected cell.

* * * * *